(12) United States Patent
Iwatsuki et al.

(10) Patent No.: US 9,864,964 B2
(45) Date of Patent: Jan. 9, 2018

(54) JOB MONITORING SUPPORT METHOD AND INFORMATION PROCESSING APPARATUS

(71) Applicant: FUJITSU LIMITED, Kawasaki-shi, Kanagawa (JP)

(72) Inventors: Daigo Iwatsuki, Seto (JP); Toshimitsu Saji, Ama (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 14/283,286

(22) Filed: May 21, 2014

(65) Prior Publication Data

US 2014/0350996 A1    Nov. 27, 2014

(30) Foreign Application Priority Data

May 24, 2013    (JP) ................... 2013-109875

(51) Int. Cl.
*G06Q 10/06*    (2012.01)
(52) U.S. Cl.
CPC ............... *G06Q 10/06316* (2013.01)
(58) Field of Classification Search
CPC .............................. G06Q 10/06316
USPC ....................................... 705/7.26
See application file for complete search history.

(56) References Cited

U.S. PATENT DOCUMENTS

| 5,101,340 | A | * | 3/1992 | Nonaka | G06Q 10/06 |
| | | | | | 717/109 |
| 5,831,670 | A | * | 11/1998 | Suzuki | G03B 13/02 |
| | | | | | 348/207.99 |
| 6,805,502 | B2 | * | 10/2004 | Rai | G06F 3/1215 |
| | | | | | 358/1.15 |
| 2002/0118214 | A1 | | 8/2002 | Card et al. | |
| 2003/0002056 | A1 | * | 1/2003 | Yamaguchi | G06K 15/00 |
| | | | | | 358/1.2 |
| 2003/0085931 | A1 | | 5/2003 | Card et al. | |

(Continued)

FOREIGN PATENT DOCUMENTS

JP    63-241605    10/1988
JP    11-096024    4/1999

(Continued)

OTHER PUBLICATIONS

Claus Hagen and Gustavo Alonso (Exception Handling in Workflow Management Systems, IEEE Transactions on Software Engineering, vol. 26, No. 10, Oct. 2000). (Year: 2000).*

(Continued)

*Primary Examiner* — Beth V Boswell
*Assistant Examiner* — Hafiz A Kassim
(74) *Attorney, Agent, or Firm* — Fujitsu Patent Center

(57) ABSTRACT

An information processing apparatus includes a memory and a processor. The memory stores job information including execution order information of a plurality of jobs. With respect to each of the plurality of jobs, the processor calculates the number of preceding jobs that hand over processed data to the job and the number of succeeding jobs that take over the processed data from the job, on the basis of the job information. The processor generates a graph that selectively displays selected jobs from the plurality of jobs on the basis of the number of preceding jobs and the number of succeeding jobs.

7 Claims, 22 Drawing Sheets

(56) References Cited

U.S. PATENT DOCUMENTS

| | | | |
|---|---|---|---|
| 2008/0115143 A1* | 5/2008 | Shimizu | G06F 9/5066 718/105 |
| 2008/0316229 A1* | 12/2008 | Terayoko | G09G 5/14 345/660 |
| 2009/0161157 A1* | 6/2009 | Aritomi | G06F 3/1207 358/1.15 |
| 2011/0138397 A1* | 6/2011 | Kikuchi | G06F 11/3476 718/106 |
| 2011/0154360 A1* | 6/2011 | Kikuchi | G06F 11/3476 718/106 |
| 2012/0188587 A1* | 7/2012 | Gaertner | G06F 3/1213 358/1.15 |

FOREIGN PATENT DOCUMENTS

| | | |
|---|---|---|
| JP | 2001-84153 A | 3/2001 |
| JP | 2002-207510 A | 7/2002 |
| JP | 2004-227281 | 8/2004 |
| JP | 2004-295508 | 10/2004 |
| JP | 2005-276091 | 10/2005 |
| JP | 2009-37637 A | 2/2009 |

OTHER PUBLICATIONS

Japanese Office Action dated Jan. 24, 2017 for corresponding Japanese Patent Application No. 2013-109875, with Partial English Translation, 8 pages.

* cited by examiner

JOB INFORMATION TABLE

| JOB NUMBER | JOB NAME | COMMAND | PRECEDING JOB COUNT | PRECEDING JOB | STATE | ... |
|---|---|---|---|---|---|---|
| 1 | JOB 1 | /job/a.exe | 0 | — | NORMAL COMPLETION | |
| 2 | JOB 2 | /job/b.exe | 1 | {1} | IN-PROGRESS | |
| 3 | JOB 3 | /job/c.exe | 1 | {2} | WAITING | |
| ... | | | | | ... | |

| START TIME | END TIME | START TIME CONDITION | SCHEDULED END TIME | OTHER STARTING CONDITIONS |
|---|---|---|---|---|
| 2012/11/27 18:55:23 | 2012/11/27 18:55:48 | — | — | — |
| 2012/11/27 18:55:48 | — | — | — | WAITING FOR FILE A |
| — | — | 19:00:00 | 19:20:00 | — |
| ... | ... | ... | ... | ... |

HISTORY INFORMATION TABLE 214

| GENERATION NUMBER | JOB NUMBER | JOB NAME | START TIME | END TIME |
|---|---|---|---|---|
| 1 | 1 | JOB 1 | 2012/11/26 18:55:23 | 2012/11/26 18:55:48 |
| | 2 | JOB 2 | 2012/11/26 18:55:48 | 2012/11/26 18:57:28 |
| | 3 | JOB 3 | 2012/11/26 19:00:00 | 2012/11/26 19:23:05 |
| | ⋮ | ⋮ | ⋮ | ⋮ |
| 2 | 1 | JOB 1 | 2012/11/25 18:55:23 | 2012/11/25 18:55:48 |
| | 2 | JOB 2 | 2012/11/25 18:55:48 | 2012/11/25 18:57:51 |
| | 3 | JOB 3 | 2012/11/25 19:00:00 | 2012/11/25 19:18:43 |
| | ⋮ | ⋮ | ⋮ | ⋮ |
| ⋮ | ⋮ | ⋮ | ⋮ | ⋮ |

FIG. 7

| CONTROL INFORMATION TABLE | 112 |
|---|---|
| USER SPECIFIED JOB | { } |
| SCREEN SIZE | 1280 × 1024p |
| SCREEN SECTION COUNT | 12 × 10 |
| GRANULARITY | 4 |
| FREE SECTION COUNT | 9 |
| FREE SECTION THRESHOLD | 20% |
| AUTOMATIC REARRANGEMENT | OFF |
| PARTIAL GRANULARITY | 1 |
| ACTIVE MONITORING MODE | OFF |

FIG. 8

GRANULARITY n=3

GRANULARITY n=4

GRANULARITY n=5

JOB MONITORING SUPPORT METHOD AND INFORMATION PROCESSING APPARATUS

CROSS-REFERENCE TO RELATED APPLICATION

This application is based upon and claims the benefit of priority of the prior Japanese Patent Application No. 2013-109875, filed on May 24, 2013, the entire contents of which are incorporated herein by reference.

FIELD

The embodiments discussed herein relate to a job monitoring support method and an information processing apparatus.

BACKGROUND

At present, it is generally done to define typical tasks that are repeatedly carried out (for example, daily routine work in business), as a set of processes (jobs) that are to be performed by a computer and then to automate the tasks using the computer.

When a plurality of jobs is registered in a computer, these jobs may successively be executed in a predetermined order. For example, a job of extracting records satisfying specified conditions from a database, a job of aggregating data included in the extracted records, and a job of generating a document file indicating the aggregation result are successively executed. Each job starts, for example, after its preceding job is completed. After branching from a job (branching point), two or more succeeding jobs may be executed in parallel. In addition, a job may start after waiting for all of two or more preceding jobs to be completed (meeting point).

If a job is repetitively executed (for example, every day), completion of the job may be delayed longer than expected due to various reasons such as a heavier workload of a computer than usual, more data than usual, a longer delay in arrival of a file to be referenced than usual, and so on. In addition, if an unexpected error occurs while a job is in progress, the job may terminate abnormally. Therefore, it is preferable that an operator of the computer monitors the execution states of jobs. To support the job monitoring, there is considered a technique of generating a graph that represents an order relationship among a plurality of jobs to thereby visualize the execution states of the jobs using the graph.

In this connection, there has been proposed a business job execution monitoring method in which an execution monitoring job is activated on a job execution apparatus, which executes a plurality of business jobs, and the execution states of the plurality of business jobs are monitored by the execution monitoring job. This execution monitoring job obtains an execution start file and an execution end file which are generated from each business job at an execution start time and at an execution end time, respectively, and determines based on the execution start file and the execution end file whether each business job is delayed or not.

Please see, for example, Japanese Patent Laid-open Publication No. 2004-295508.

In visualizing job execution states using a graph, it is preferable that the graph is entirely or almost entirely displayed on one screen so as to enable an operator to overlook the execution states of monitored jobs as a whole. If only a part of the graph is displayed on the screen, the operator needs to switch the display area to confirm every part of the graph, which results in poor operability and poor recognition. However, if there is an increase in the number of monitored jobs, it would be difficult to display all nodes corresponding to the jobs on one screen.

In the case where a plurality of jobs is in a hierarchical form that is suitable for monitoring, it may be possible to display the entire graph on one screen by representing each higher level job as one node. In the case where a plurality of jobs is not previously arranged in a hierarchical form that is suitable for monitoring, on the contrary, it is not easy to generate a hierarchical graph from such a job group.

SUMMARY

According to one aspect, there is provided a non-transitory computer-readable storage medium storing a computer program. The computer program causes a computer to perform a procedure including obtaining job information including execution order information of a plurality of jobs; calculating, with respect to each of the plurality of jobs, a number of preceding jobs that hand over processed data to the each of the plurality of jobs and a number of succeeding jobs that take over the processed data from the each of the plurality of jobs based on the job information; and generating a graph that selectively displays selected jobs from the plurality of jobs based on the number of preceding jobs and the number of succeeding jobs.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 6 illustrates an example of a job information table;

FIG. 7 illustrates an example of a history information table;

FIG. 8 illustrates an example of a control information table;

DESCRIPTION OF EMBODIMENTS

Figure 1:
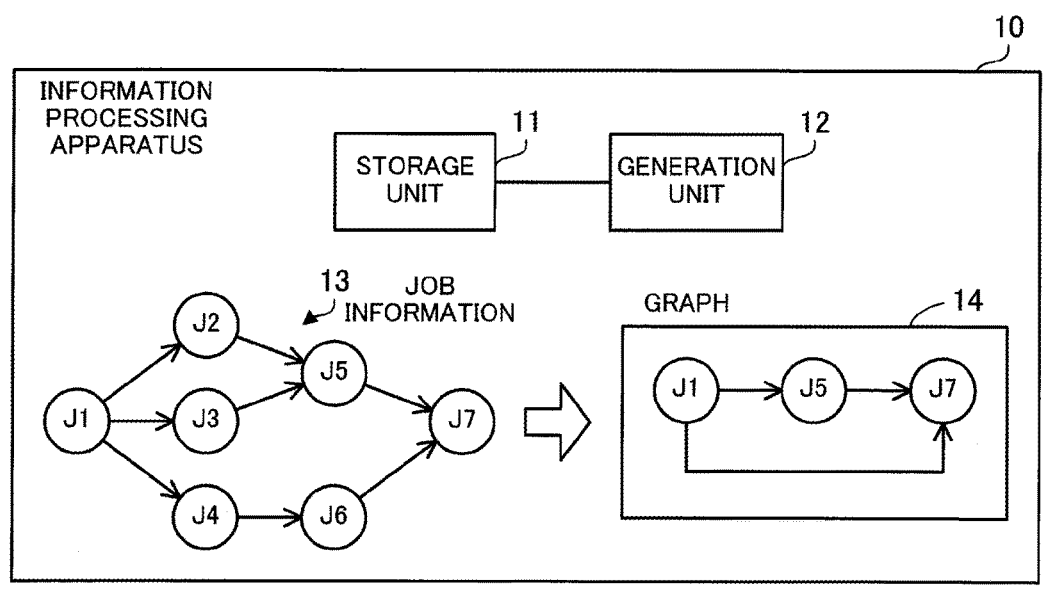
FIG. 1 illustrates an information processing apparatus according to a first embodiment.

Several embodiments will be described below with reference to the accompanying drawings, wherein like reference numerals refer to like elements throughout.

First Embodiment

FIG. 1 illustrates an information processing apparatus according to a first embodiment.

An information processing apparatus 10 of the first embodiment supports monitoring of the execution states of a plurality of jobs. The information processing apparatus 10 may be a client computer, which is used as a terminal device by an operator, or may be a server computer. Jobs may be executed by the information processing apparatus 10 or other computers.

The information processing apparatus 10 includes a storage unit 11 and a generation unit 12. The storage unit 11 may be a volatile storage device, such as a Random Access Memory (RAM), or a non-volatile storage device, such as a Hard Disk Drive (HDD) or a flash memory. The generation unit 12 may include a Central Processing Unit (CPU), a Digital Signal Processor (DSP), an Application Specific Integrated Circuit (ASIC), a Field Programmable Gate Array (FPGA), and so on. The generation unit 12 may be a processor that executes a program. The "processor" here may be a set of a plurality of processors (multiprocessor).

The storage unit 11 stores job information 13 including execution order information of jobs. The execution order information indicates an order in which the jobs are started and may be said to indicate dependency relationship among the jobs. Immediately before a certain job, there may be a preceding job that hands over processed data to the job, and the job is said to depend on the preceding job. Also, immediately after a certain job, there may be a succeeding job that takes over the processed data from the job.

In principle, each job is started after its preceding job is completed. In the case where a job has a plurality of preceding jobs, for example, the job waits for completion of the preceding jobs and then is started. Such a job may be called a meeting point. In addition, in the case where a job has a plurality of succeeding jobs, for example, the plurality of succeeding jobs is executed in parallel after the job is completed. Such a job may be called a branching point.

Referring to the example of FIG. 1, the job information 13 includes information on jobs J1 to J7. The job J1 has the jobs J2 to J4 as succeeding jobs. The job J2 has the job J1 as a preceding job and the job J5 as a succeeding job. The job J3 has the job J1 as a preceding job and the job J5 as a succeeding job. The job J4 has the job J1 as a preceding job and the job J6 as a succeeding job. The job J5 has the jobs J2 and J3 as preceding jobs and the job J7 as a succeeding job. The job J6 has the job J4 as a preceding job and the job J7 as a succeeding job. The job J7 has the jobs J5 and J6 as preceding jobs.

The generation unit 12 generates a graph 14 that selectively displays selected jobs from the plurality of jobs on the basis of the job information 13. The graph 14 includes nodes corresponding to the selected jobs and links connecting the nodes. The jobs displayed in the graph 14 may be a subset of the plurality of jobs indicated by the job information 13. The links included in the graph 14 represent an order in which the selected jobs are executed. The graph 14 may not display all of the jobs indicated in the job information 13, meaning that some of the jobs are hidden.

To generate the graph 14, the generation unit 12 calculates the number of preceding jobs and the number of succeeding jobs with respect to each of the plurality of jobs. The generation unit 12 then selects jobs to be displayed in the graph 14, from the plurality of jobs on the basis of the number of preceding jobs and the number of succeeding jobs of each job. Selecting some of the jobs indicated by the job information 13 amounts to limiting the number of jobs to be displayed in the graph 14. For example, the generation unit 12 selects jobs in which at least one of the number of preceding jobs and the number of succeeding jobs is greater than or equal to a threshold. The generated graph 14 may be displayed on a display connected to the information processing apparatus 10 or may be transferred to another computer and displayed on a display connected to the other computer.

Referring to the example of FIG. 1, the job J1 has three succeeding jobs. Each of the jobs J2 to J4 has one preceding job and one succeeding job. The job J5 has two preceding jobs and one succeeding job. The job J6 has one preceding job and one succeeding job. The job J7 has two preceding jobs. Assuming that the threshold is two, the generation unit 12 selects the jobs J1, J5, and J7 but does not select the other jobs J2 to J4 and J6. In this case, the generation unit 12 includes nodes corresponding to the jobs J1, J5, and J7 in the graph 14, excluding nodes corresponding to the jobs J2 to J4 and J6.

In this connection, the generation unit 12 may be designed to change the threshold according to the size of a display area where the graph 14 is displayed. For example, on the conditions that all (or almost) of nodes corresponding to selected jobs are displayed in the display area, the generation unit 12 sets a minimum numerical threshold. In addition, in the above explanation, the job information 13 is stored in the storage unit 11. Alternatively, the generation unit 12 may obtain the job information 13 from another computer.

The information processing apparatus 10 of the first embodiment selectively displays, in the graph 14, selected jobs from a plurality of jobs on the basis of the number of preceding jobs and the number of succeeding jobs of each job. Even in the case where there is a great number of jobs registered in a computer, it is possible to reduce the number of nodes (jobs to be visualized) to be included in the graph 14, thereby enabling the execution state of an entire business flow including a plurality of jobs to be overlooked on a screen.

Further, jobs that are probably important in monitoring the business flow are automatically set as monitoring points, and therefore a graph 14 with high usability is generated. For example, extracting jobs having many preceding jobs or succeeding jobs makes it possible to set jobs that are probably important in monitoring delays, such as branching points and meeting points, as monitoring points. Still further, even if jobs are not in a hierarchical form that is suitable for monitoring, it is possible to generate a graph 14 that displays appropriate monitoring points. This makes it easy to monitor the execution states of jobs.

Second Embodiment

Figure 2:
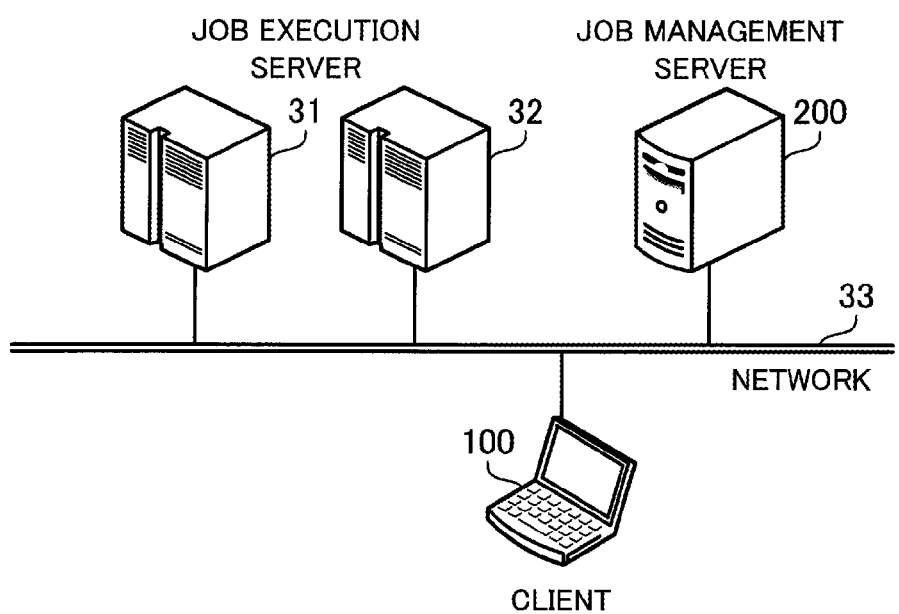
FIG. 2 illustrates a system according to a second embodiment.

FIG. 2 illustrates a system according to a second embodiment.

A system of the second embodiment includes job execution servers 31 and 32, a client 100, and a job management server 200. The job execution servers 31 and 32, client 100, and job management server 200 are connected to a network 33.

The job execution servers 31 and 32 are server computers that execute jobs previously defined in programs. Jobs mean a set of processes to be performed by a computer, which is a definition of repetitive typical tasks in business. For example, a single job corresponds to a single command. A job is repeatedly executed according to a predetermined schedule (once every day). The network 33 may include a Local Area Network (LAN) or may include a wide area network, such as the Internet.

The client 100 is a client computer, which is operated as a terminal device by a user (for example, an operator of the system). The client 100 accesses the job management server 200 over the network 33 to obtain data for job management from the job management server 200. The client 100 then generates a graph that is a visualization of the execution states of jobs that are executed by the job execution servers 31 and 32, on the basis of the obtained data. The user monitors the job execution states in the generated graph. If there is a job delay or an abnormal job termination, the user may take appropriate measures.

The job management server 200 is a server computer that manages a schedule for starting jobs, an order relationship among a plurality of jobs, the progresses of the jobs, and others. For example, the job management server 200 instructs the job execution servers 31 and 32 to start jobs according to the predetermined schedule. The job management server 200 also collects information indicating the execution results of the jobs from the job execution servers 31 and 32 over the network 33. In addition, the job management server 200 provides the client 100 with data for job management.

In this connection, the client 100 is one example of the information processing apparatus 10 of the first embodiment. In the above explanation, the job execution servers 31 and 32 that execute jobs and the job management server 200 that manages the jobs are separate servers. Alternatively, the job management server 200 may be designed to execute jobs.

Figure 3:
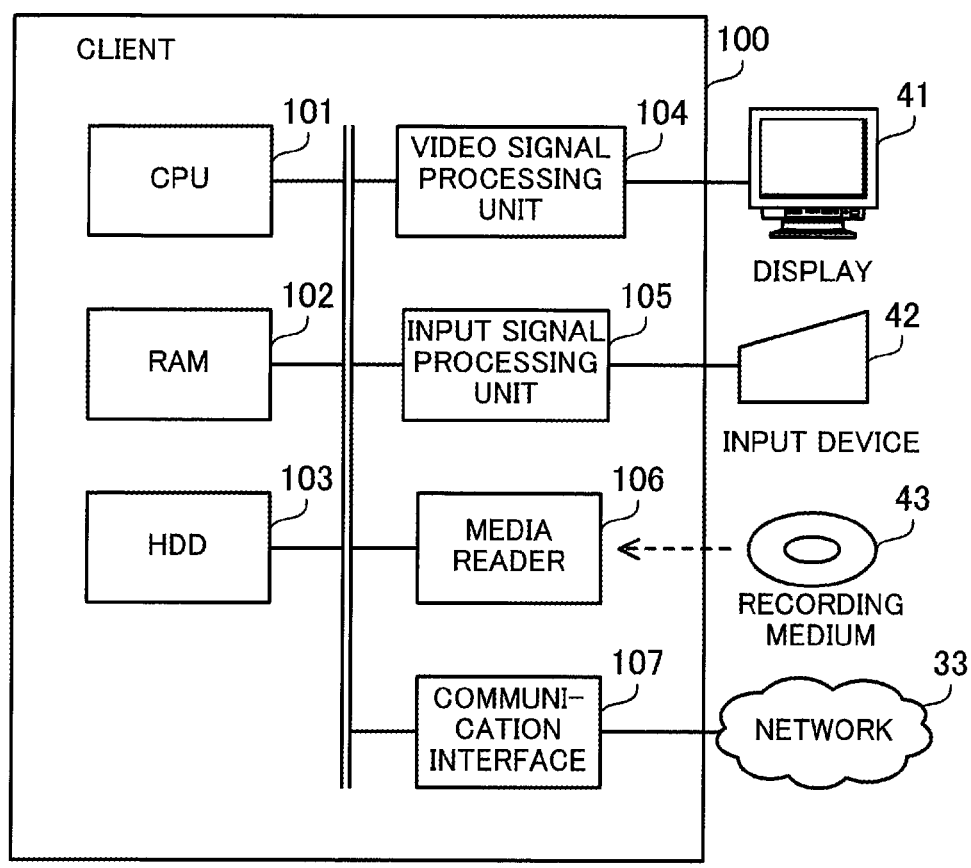
FIG. 3 is a block diagram illustrating an example of a hardware configuration of a client.

FIG. 3 is a block diagram illustrating an example of a hardware configuration of a client.

The client 100 includes a CPU 101, a RAM 102, an HDD 103, a video signal processing unit 104, an input signal processing unit 105, a media reader 106, and a communication interface 107. The CPU 101 is one example of the generation unit 12 of the first embodiment, and the RAM 102 or HDD 103 is one example of the storage unit 11 of the first embodiment.

The CPU 101 is a processor that includes an operating circuit to execute instructions described in a program. The CPU 101 loads at least part of a program and data from the HDD 103 to the RAM 102, and runs the program. In this connection, the CPU 101 may be provided with a plurality of processor cores, the client 100 may be provided with a plurality of processors, and the processes to be described later may be performed in parallel using the plurality of processors or processor cores. In addition, a set of a plurality of processors (multiprocessor) may be called a processor.

The RAM 102 is a volatile memory that temporarily stores programs to be executed by the CPU 101 and data to be used in operations by the CPU 101. In this connection, the client 100 may be provided with another type of memory than RAM or a plurality of memories.

The HDD 103 is a non-volatile storage device that stores software programs, such as an Operating System (OS) program, application software, etc., and data. In this connection, the client 100 may be provided with another type of storage device, such as a flash memory, a Solid State Drive (SSD), or another, or a plurality of non-volatile storage devices.

The video signal processing unit 104 outputs images to a display 41 connected to the client 100 in accordance with instructions from the CPU 101. A Cathode Ray Tube (CRT) display, a Liquid Crystal Display (LCD), a Plasma Display Panel (PDP), an Organic Electro-Luminescence (OEL) display, or another may be used as the display 41.

The input signal processing unit 105 obtains an input signal from an input device 42 connected to the client 100, and outputs the input signal to the CPU 101. As the input device 42, a pointing device, such as a mouse, a touch panel, a touchpad, a trackball, etc., a keyboard, a remote controller, a button switch, etc. may be used. In addition, some types of input devices may be connected to the client 100.

The media reader 106 is a reading device that reads programs and data from a recording medium 43. As the recording medium 43, for example, a magnetic disk, such as a flexible disk (FD) or an HDD, an optical disc, such as a Compact Disc (CD) or a Digital Versatile Disc (DVD), a Magneto-Optical disk (MO), a semiconductor memory, or another may be used. The media reader 106 stores, for example, a program and data read from the recording medium 43 in the RAM 102 or HDD 103.

The communication interface 107 is an interface that is connected to a network 33, and enables communication with the job execution servers 31 and 32 and the job management server 22 via the network 33. The communication interface 107 may be a wired communication interface that is connected to a communication device with a cable, or a wireless communication interface that is connected to a base station via a wireless link.

In this connection, the client 100 may be configured without the media reader 106. Further, the display 41 and input device 42 may be formed integrally with the casing of the client 100. The job execution servers 31 and 32 and the job management server 200 may be configured with the same hardware configuration as the client 100. In this connection, if the job execution servers 31 and 32 and the job management server 200 are controlled over the network 33 from a terminal device, the job execution servers 31 and 32 and the job management server 200 may be configured without the video signal processing unit 104 or the input signal processing unit 105.

Figure 4:
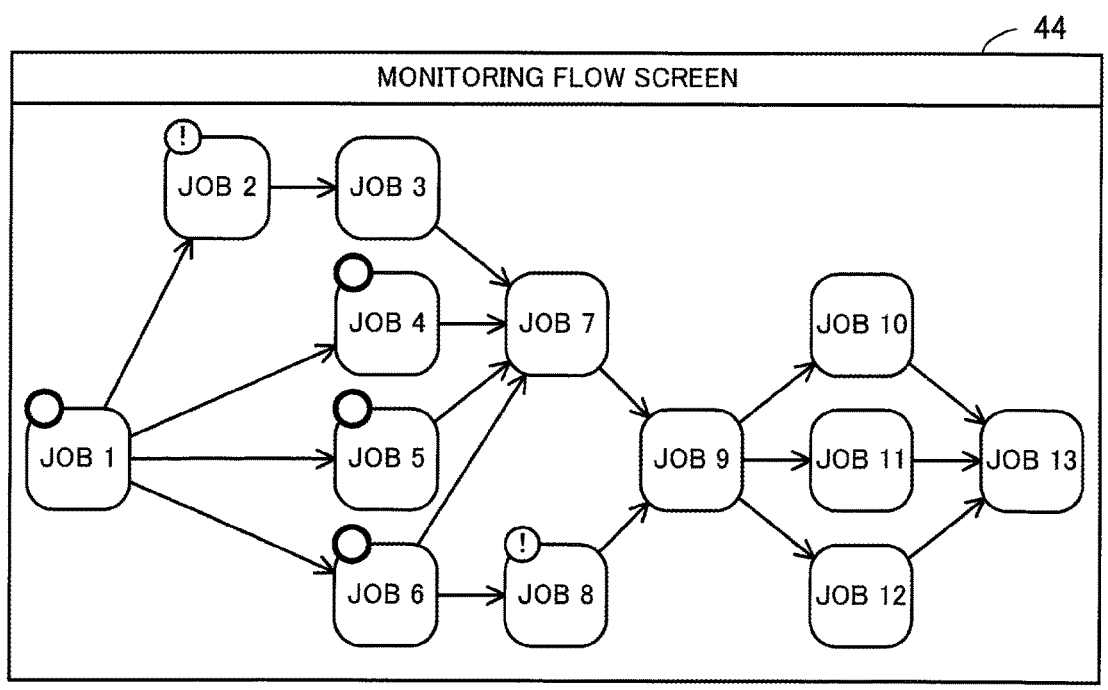
FIG. 4 illustrates an example of a monitoring flow screen.

FIG. 4 illustrates an example of a monitoring flow screen.

The client 100 generates a monitoring flow screen 44, as illustrated in FIG. 4, on the basis of data obtained from the job management server 200, and displays the monitoring flow screen 44 on the display 41.

On the monitoring flow screen 44, a graph (directed graph) including nodes corresponding to jobs or job nets and links connecting the nodes in accordance with an order in which the jobs are executed is displayed as a monitoring flow. A job net is a hierarchy of a plurality of jobs, in which a group of jobs at a lower level is seen from a higher level. When expanding a node corresponding to a job net (to trace the hierarchy to a lower level), another graph corresponding to the group of jobs at the lower level appears. In the following, however, it is assumed that one node corresponds to a single job for simple explanation.

Information indicating the state of a job is added to a node. Job states include, for example, normal termination, in-progress, abnormal termination, and so on. On the monitoring flow screen 44, the user is able to confirm whether or not there is a job being delayed or a job that terminated abnormally. In this connection, with an increase in the number of jobs, it becomes difficult to display on a screen an entire graph that represents all of the jobs executable by the job execution servers 31 and 32. To deal with this situation, the client 100 of the second embodiment is designed to select monitoring points from a plurality of jobs and to display only the selected monitoring points in a graph.

In the following explanation, it is assumed that a job group including jobs 1 to 13 illustrated in FIG. 4 is registered in the job management server 200. A job group is a set of jobs that are successively executed, and includes one start point and one end point. Each job other than the start point has one or more jobs (preceding jobs) that need to be executed immediately before the job. In addition, each job other than the end point has one or more jobs (succeeding jobs) that need to be executed immediately after the job.

In principle, a job is started after its preceding job is completed. If there are two or more preceding jobs, the job is started after these preceding jobs are all completed. A job having two or more preceding jobs may be called a meeting point. In this connection, there may be a job for which starting conditions other than completion of preceding jobs are set. Such starting conditions may include a start time, receipt of a predetermined file, occurrence of a predetermined event, or the like. If there are two or more succeeding jobs, these succeeding jobs may be executed in parallel. A job having two or more succeeding jobs may be called a branching point.

The job 1 is a start and branching point, and its succeeding jobs are the jobs 2 and 4 to 6. The job 2 has the job 1 as a preceding job and the job 3 as a succeeding job. The job 3 has the job 2 as a preceding job and the job 7 as a succeeding job. The jobs 4 and 5 have the job 1 as a preceding job and the job 7 as a succeeding job. The job 6 is a branching point and has the job 1 as a preceding job and the jobs 7 and 8 as succeeding jobs. The job 7 is a meeting point and has the jobs 3 to 6 as preceding jobs and the job 9 as a succeeding job. The job 8 has the job 6 as a preceding job and the job 9 as a succeeding job. The job 9 is a meeting and branching point and has the jobs 7 and 8 as preceding jobs and the jobs 10 to 12 as succeeding jobs. The jobs 10 to 12 have the job 9 as a preceding job and the job 13 as a succeeding job. The job 13 is a meeting and end point and has the jobs 10 to 12 as preceding jobs.

A display area for the monitoring flow screen 44 is divided into a plurality of sections. One section may display one node. The size of the node is previously determined, and the number of sections for displaying nodes may vary depending on the size of the display area. Each section may be specified by using coordinates. For example, assuming that the horizontal and vertical directions of the monitoring flow screen 44 are taken as x- and y-axes, respectively, each section may be specified by using coordinates (x, y).

Figure 5:
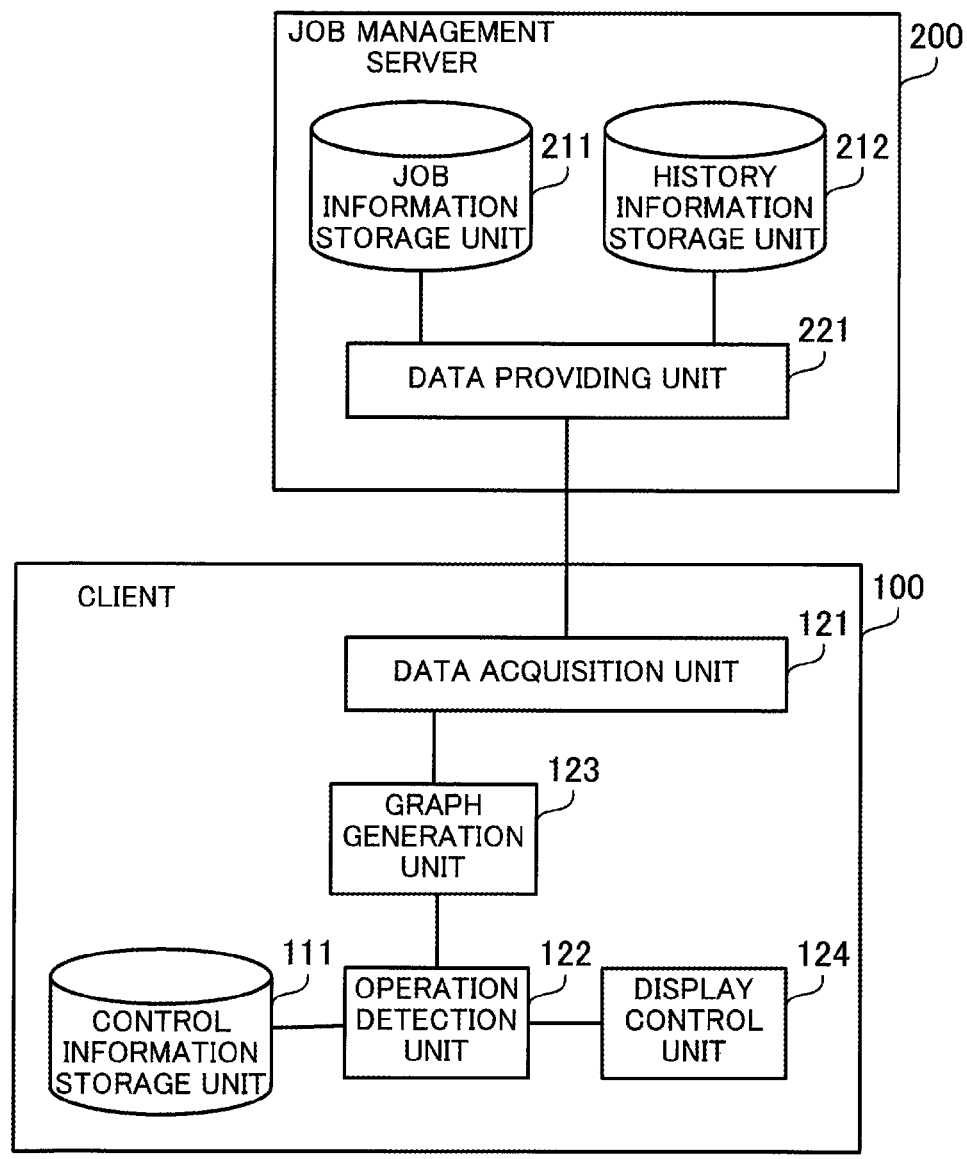
FIG. 5 is a block diagram illustrating an example of functions of a client and a job management server.

FIG. 5 is a block diagram illustrating an example of functions of a client and a job management server.

The client 100 includes a control information storage unit 111, a data acquisition unit 121, an operation detection unit 122, a graph generation unit 123, and a display control unit 124. The control information storage unit 111 is implemented by using a memory space prepared in the RAM 102 or the HDD 103. The data acquisition unit 121, operation detection unit 122, graph generation unit 123, and display control unit 124 are implemented as software modules that are executed by the CPU 101. In this connection, these functions may partially or wholly be implemented by using dedicated electronic circuits, such as ASIC.

The control information storage unit 111 stores control information for controlling the operation of the graph generation unit 123. The control information includes setting information specified by a user and intermediate information obtained in the course of generating a graph. The control information is supplied to the graph generation unit 123 via the operation detection unit 122. The control information is updated by the operation detection unit 122 in accordance with user operations or responses from the graph generation unit 123. The control information will be described in detail later.

The data acquisition unit 121 accesses the job management server 200 over the network 33 in response to a request from the graph generation unit 123. The data acquisition unit 121 then obtains data for job management from the job management server 200, and supplies the data to the graph generation unit 123. The obtained data includes job information and history information, as will be described later.

The operation detection unit 122 detects a user operation made using the input device 42 on the monitoring flow screen 44. When detecting a user operation instructing visualization, the operation detection unit 122 requests the graph generation unit 123 to generate a graph. At this time, the operation detection unit 122 reads the control information from the control information storage unit 111 and supplies the control information to the graph generation unit 123. Then, the operation detection unit 122 supplies the graph generated by the graph generation unit 123 to the display control unit 124.

When detecting a user operation instructing a change of a display form, the operation detection unit 122 requests the graph generation unit 123 to re-generate a graph in the requested display form, and supplies the new graph to the display control unit 124. When detecting a user operation instructing a change of setting, the operation detection unit 122 updates the control information stored in the control information storage unit 111. The operation detection unit 122 may also update the control information in accordance with a response from the graph generation unit 123.

The graph generation unit 123 generates a graph that is a visualization of the execution states of jobs, in response to a request from the operation detection unit 122. When requested for generating a graph by the operation detection unit 122, the graph generation unit 123 requests the data acquisition unit 121 for data for job management. The graph generation unit 123 then generates a graph on the basis of the data obtained from the data acquisition unit 121 and the control information received from the operation detection unit 122, and supplies the generated graph to the operation detection unit 122. At this time, the graph generation unit 123 updates the control information where appropriate. The generation of a graph will be described in detail later.

The display control unit 124 controls a screen to be displayed on the display 41. When receiving a graph from the operation detection unit 122, the display control unit 124 draws the graph in a predetermined display area on the monitoring flow screen 44, and outputs the monitoring flow screen 44 to the display 41.

The job management server 200 includes a job information storage unit 211, a history information storage unit 212, and a data providing unit 221. The job information storage unit 211 and history information storage unit 212 are implemented by using memory spaces prepared in an RAM or HDD. The data providing unit 221 is implemented as a software module to be executed by a CPU. In this connection, their functions may partially or wholly be implemented by using dedicated electronic circuits, such as ASIC.

The job information storage unit 211 stores job information indicating the definitions of jobs and the current execution states of the jobs (for example, today's execution states in the case where each job is executed once every day). The definitions of a job include relationship with preceding jobs and succeeding jobs and starting conditions other than completion of the preceding jobs. The current execution states of a job include a start time, an end time, and the state of the job (for example, in-progress, normal termination, or another). The job information will be described in detail later.

The history information storage unit 212 stores history information indicating the past execution states of jobs for a prescribed number of past executions (for example, for the last one month in the case where each job is executed once every day). The past execution states of a job include a start time and an end time. The history information will be described in detail later.

The data providing unit 221 reads job information from the job information storage unit 211 in response to a request from the client 100 and transmits the job information to the client 100. The data providing unit 211 also reads history information from the history information storage unit 212 in response to the request from the client 100 and transmits the history information to the client 100. The data providing unit 211 may be designed to receive a request for job information and a request for history information separately from the client 100 and to transmit the job information and the history information separately to the client 100. Alternatively, the data providing unit 211 may be designed to transmit the job information and the history information together. In the following explanation, it is assumed that the job information and the history information are transmitted separately.

FIG. 6 illustrates an example of a job information table.

A job information table 213 is stored in the job information storage unit 211. The job information table 213 includes the following fields: Job Number, Job Name, Command, Preceding Job Count, Preceding Job, State, Start Time, End Time, Start Time Condition, Scheduled End Time, and Other Starting Conditions.

The Job Number field contains a job number that is identification information identifying a job. The Job Name field contains a job name given to the job so as to enable users to easily confirm the contents of the job. In this connection, the job number may be used as the job name. The Command field contains the path to and file name of an execute file for a program corresponding to the job. When the starting conditions of the job are met, the execute file is activated. The Preceding Job Count field indicates the number of preceding jobs. This Preceding Job Count field has a value of "0" for a start point and has a value of "1" or greater for each job other than the start point. The Preceding Job field contains the job numbers of one or more preceding jobs.

The State field contains information indicating the state of the job. The states of a job include "waiting (not yet executed)", "in-progress", "normal completion", and "abnormal termination". The Start Time field indicates the time the job, if not in a waiting state, was started. The End Time field indicates the time the job, if completed normally or abnormally, was completed.

The Start Time Condition field indicates the time to start the job. In the case where a start time condition is set, the job is not started until the specified time comes, even after its preceding jobs are completed. The Scheduled End Time field indicates a user expected end time of the job. The Other Starting Conditions field contains starting conditions other than completion of preceding jobs and the start time condition. The other starting conditions include arrival of a predetermined file and occurrence of a predetermined event. In the case where the other starting conditions are set, the job is not started until the conditions are met, even after its preceding jobs are completed. In this connection, the start time condition, scheduled end time, and other starting conditions may or may not be set, depending on the job.

FIG. 7 illustrates an example of a history information table.

The history information table 214 is stored in the history information storage unit 212. The history information storage unit 212 stores the past execution states of jobs for a prescribed number of past executions. The history information table 214 includes the following fields: Generation Number, Job Number, Job Name, Start Time, and End Time.

The Generation Number field contains a generation number that is identification information for discriminating plural executions of a job from each other. For example, if a job is executed once every day, the execution of the job executed yesterday and the execution of the job executed the day before yesterday are discriminated by the generation numbers. In this connection, the generation numbers may be represented by date. The Job Number field and Job Name field contain the same job number and job name as those contained in the job information table 213. The Start Time field indicates the time the job was started in the past. The End Time field indicates the time the job was completed in the past.

In this connection, the history information table 214 may additionally include some or all of the Command field, Preceding Job Count field, Preceding Job field, State field, Start Time Condition field, Scheduled End Time field, and Other Starting Conditions field included in the job information table 213. In addition, the history information table 214 may be prepared for each generation (for one-time execution of a job group) and stored in the history information storage unit 212.

FIG. 8 illustrates an example of a control information table.

The control information table 112 is stored in the control information storage unit 111. The control information table 112 includes the following fields: User Specified Job, Screen Size, Screen Section Count, Granularity, Free Section Count, Free Section Threshold, Automatic Rearrangement, Partial Granularity, and Active Monitoring Mode.

The User Specified Job field lists the job numbers of jobs specified by a user as monitoring points from a plurality of jobs. The monitoring points specified by the user are fixedly displayed in a graph, irrespective of the size of a display area. The Screen Size field indicates a screen size that is the size of a display area where the graph on the monitoring flow screen 44 is displayed. The screen size may automatically be set according to the resolution of the display 41 connected to the client 100. The Screen Section Count field indicates the number of screen sections that is equivalent to the number of nodes that are able to be arranged in the horizontal and vertical directions. The number of screen sections is calculated based on the preset size of single node and a screen size.

The Granularity field contains a threshold for use in limiting jobs to be visualized in a graph according to the number of preceding jobs and the number of succeeding jobs. Jobs to be visualized each have at least one of the number of preceding jobs and the number of succeeding jobs being greater than or equal to the granularity. The Free Section Count field indicates the number of free sections obtained by subtracting the number of nodes included in the graph from the number of sections of the screen. If the number of nodes included in a graph is more than the number of the sections of the screen (in the case where it is not possible to display an entire graph in a display area), the number of free sections is a negative value. The Free Section Threshold field contains a threshold for a ratio of free sections to screen sections. If a ratio of free sections obtained after the granularity is determined is greater than or equal to the threshold, jobs that satisfy predetermined conditions are added to the graph.

The Automatic Rearrangement field contains a flag indicating whether arrangement of nodes is automatically adjusted on the monitoring flow screen 44 or not. In the case where the automatic rearrangement of "OFF" is set, relative positional relationship among nodes prior to limiting nodes to be displayed is maintained. In the case where the automatic rearrangement of "ON" is set, on the other hand, remaining nodes are arranged closer to each other, irrespective of their original positional relationship. The Partial Granularity field indicates a partial granularity to be applied to a user-specified portion of the graph. By applying a different granularity from that for the entire graph, to a part of the graph, the specified portion is displayed in more detail (the number of nodes to be displayed is increased).

The Active Monitoring Mode field contains a flag indicating whether the graph is displayed in an active monitoring mode or not. In the case where the active monitoring mode of "OFF" is set (in the case of a normal mode), nodes corresponding to a start point and an end point are displayed in the graph so as to enable a plurality of jobs to be entirely overlooked. In the case where the active monitoring mode of "ON" is set, on the other hand, jobs to be visualized are limited to jobs in an area (active area) where jobs in progress and jobs that terminated abnormally exist. In the active monitoring mode, nodes corresponding to a start point and an end point may not be displayed in the graph.

Figure 9:
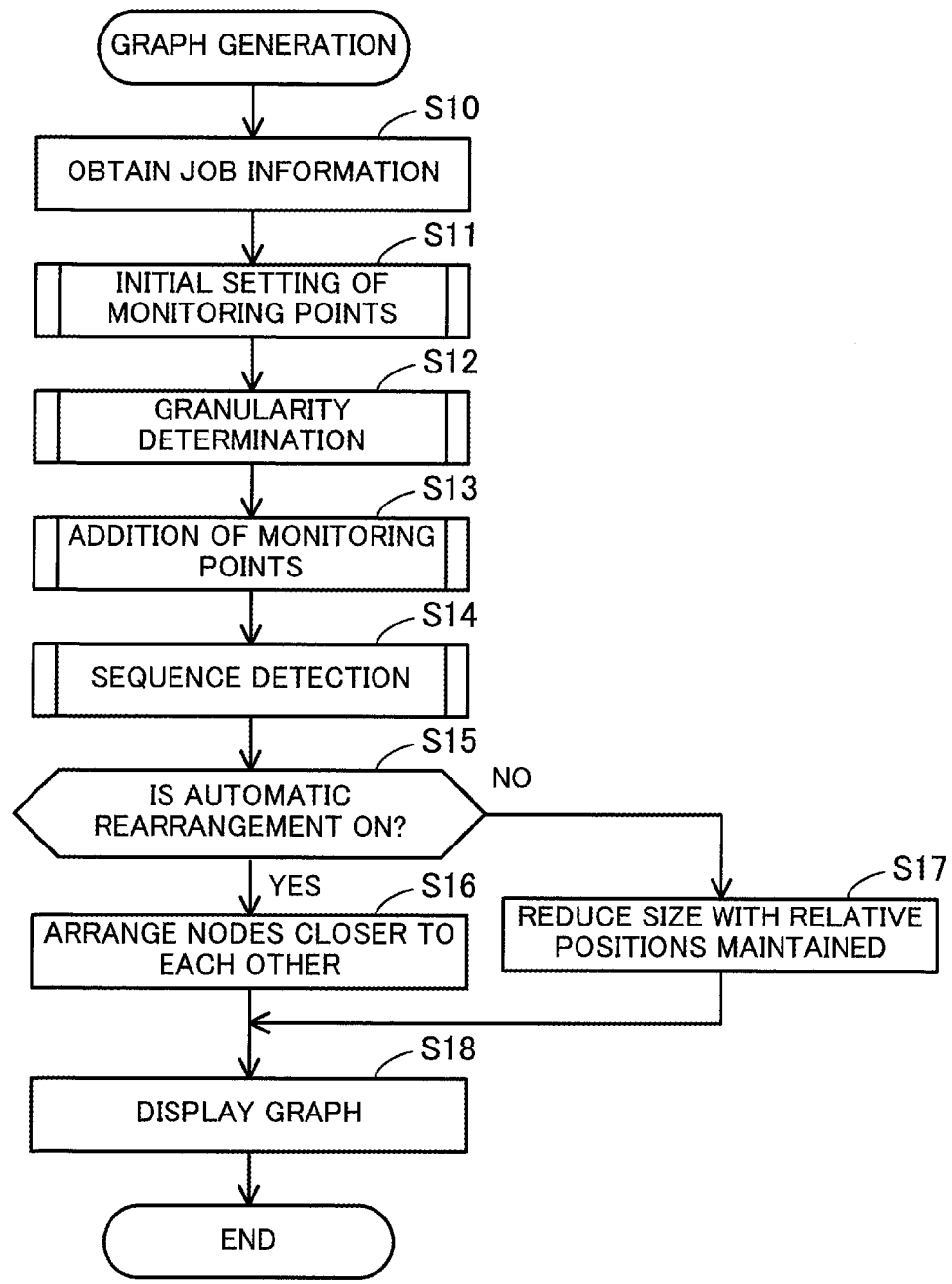
FIG. 9 is a flowchart illustrating an exemplary procedure for graph generation.

FIG. 9 is a flowchart illustrating an exemplary procedure for graph generation.

(S10) The data acquisition unit 121 accesses the job management server 200 and obtains job information (job information table 213) from the job management server 200.

(S11) The graph generation unit 123 performs initial setting of monitoring points. The initially set monitoring points are fixedly displayed in a graph, irrespective of the granularity n, and include user-specified jobs, a start point job, and an end point job.

(S12) The graph generation unit 123 determines the granularity n such that the graph is entirely or almost entirely displayed in the display area on the monitoring flow screen 44. For example, the graph generation unit 123 finds such a minimum granularity n that the number of monitoring points is less than or equal to the number of sections of the screen while sequentially increasing the granularity n in order from one. In addition to the initially set monitoring points, jobs in which at least one of the number of preceding jobs and the number of succeeding jobs is greater than or equal to the granularity n are set as monitoring points. The monitoring points that are set here are branching points and meeting points, excluding the case where the granularity n is one.

(S13) The graph generation unit 123 adds monitoring points depending on the number of free sections remaining after the monitoring points are set at steps S11 and S12 so that the number of jobs to be displayed in the graph is not too few. Candidates for monitoring points to be added include jobs for which a start time condition or a scheduled end time is set and jobs for which a starting condition including waiting for a file or an event are set. In addition, other candidates for monitoring points to be added include jobs that each have big variation (a degree of dispersion) in past execution times.

(S14) The graph generation unit 123 detects the sequence relationship in execution timing among the monitoring points set at steps S11 to S13, and thereby generates a graph that includes nodes corresponding to the set monitoring points and links representing the detected sequence relationship.

(S15) The graph generation unit 123 determines whether the automatic rearrangement of ON is set in the control information table 112 or not. In the case of the automatic rearrangement of ON, the process proceeds to step S16. In the case of the automatic rearrangement of OFF, the process proceeds to step S17.

(S16) The graph generation unit 123 determines arrangement of the nodes corresponding to the monitoring points. At this time, the graph generation unit 123 arranges the nodes closer to each other, irrespective of the original positional relationship prior to the limiting of the nodes to be displayed. Then, the process proceeds to step S18.

(S17) The graph generation unit 123 determines arrangement of the nodes corresponding to the monitoring points. At this time, the graph generation unit 123 reduces the size of the graph while maintaining the original relative positional relationship prior to the limiting of the nodes to be displayed. For example, the graph generation unit 123 reduces the lengths of the links at a predetermined ratio so as to display the graph entirely or almost entirely, without changing the sizes of the nodes.

(S18) The operation detection unit 122 provides the graph generated by the graph generation unit 123 to the display control unit 124. The display control unit 124 then displays the graph on the monitoring flow screen 44.

Figure 10:
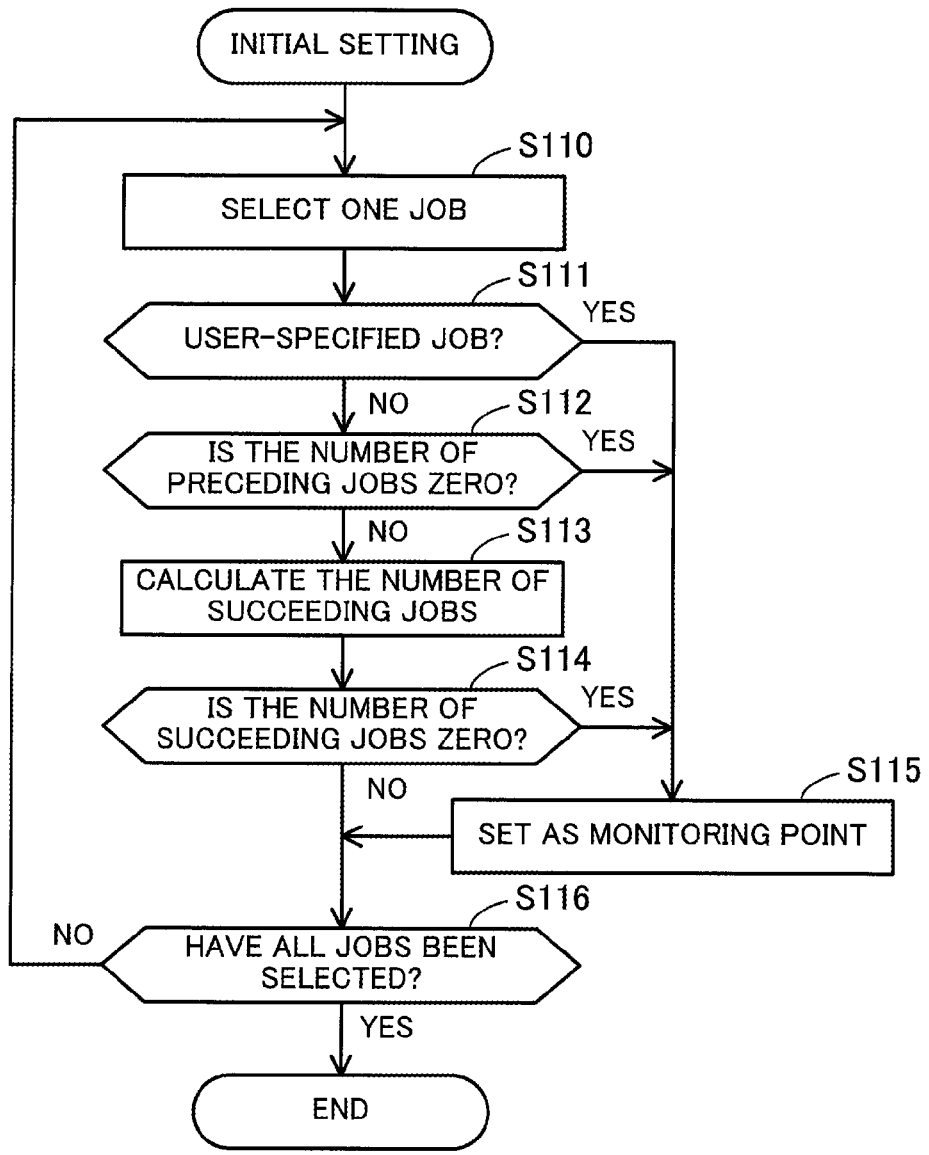
FIG. 10 is a flowchart illustrating an exemplary procedure for initial setting.

FIG. 10 is a flowchart illustrating an exemplary procedure for initial setting. The process described in the flowchart of FIG. 10 is performed at above-described step S11.

(S110) The graph generation unit 123 obtains the job information table 213 from the data acquisition unit 121 and selects one of the jobs registered in the job information table 213.

(S111) The graph generation unit 123 determines whether the selected job is registered as a user-specified job in the control information table 112 or not. If the job is a user-specified job, the process proceeds to step S115. Otherwise, the process proceeds to step S112.

(S112) The graph generation unit 123 determines whether the selected job is a start point or not, i.e., whether the number of its preceding jobs is zero or not. If the number of its preceding jobs is zero, the process proceeds to step S115. Otherwise (if the job is not a start point), the process proceeds to step S113.

(S113) The graph generation unit 123 calculates the number of jobs (succeeding jobs) whose preceding jobs include the job selected at step S110, with reference to the job information table 213.

(S114) The graph generation unit 123 determines whether the selected job is an end point or not, i.e., whether the number of its succeeding jobs calculated at step S113 is zero or not. If the number of its succeeding jobs is zero, the process proceeds to step S115. Otherwise, the process proceeds to step S116.

(S115) The graph generation unit 123 sets the selected job as a monitoring point. That is, user-specified jobs, a start point job, and an end point job are set as monitoring points.

(S116) The graph generation unit 123 determines whether all of the jobs registered in the job information table 213 have been selected at step S110 or not. If there is any unselected job, the process proceeds back to step S110. If all of the jobs have been selected, the process is completed.

Figure 11:
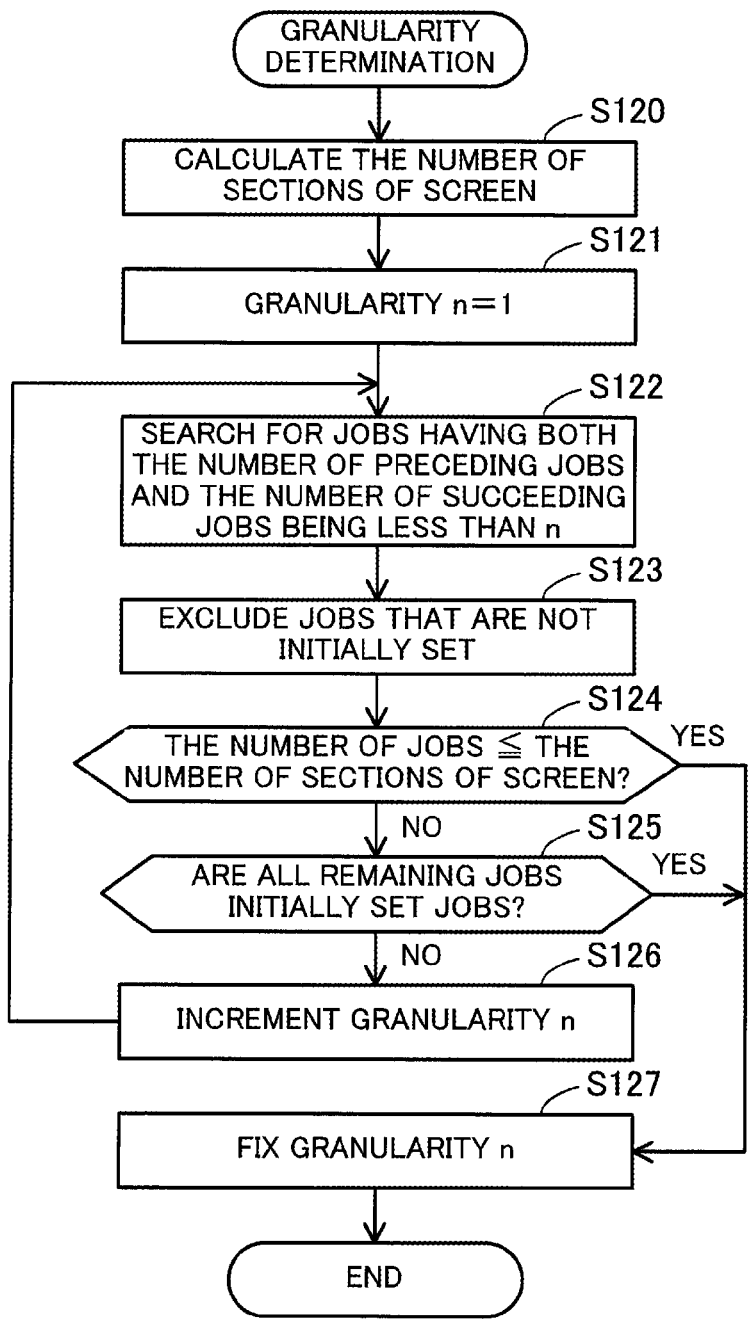
FIG. 11 is a flowchart illustrating an exemplary procedure for granularity determination.

FIG. 11 is a flowchart illustrating an exemplary procedure for granularity determination. The process described in the flowchart is performed at above-described step S12.

(S120) The graph generation unit 123 calculates the number of sections of a screen, i.e., the number of nodes that are displayable on the monitoring flow screen 44, on the basis of the screen size indicated in the control information table 112. For example, the graph generation unit 123 divides each of the horizontal length and vertical length of the display area by the side length of single node, and then multiplies the obtained values, which indicate the numbers of nodes that are able to be arranged in the horizontal direction and the vertical direction.

(S121) The graph generation unit 123 tentatively sets the granularity n to one.

(S122) The graph generation unit 123 searches the jobs registered in the job information table 213 to find jobs having both the number of preceding jobs and the number of succeeding jobs being less than n. For example, the number of succeeding jobs calculated at step S113 is used in this step.

(S123) The graph generation unit 123 excludes, from monitoring points, jobs other than jobs (user-specified jobs, start point job, and end point job) set as monitoring points at above-described step S11 out of the jobs found at step S122. In this connection, in the case of the granularity n of one, there are no jobs that satisfy the conditions described in step S122. Therefore, in the case of the granularity n of one, steps S122 and S123 may be skipped.

(S124) The graph generation unit 123 determines whether the number of remaining jobs, which have not been excluded, is less than or equal to the number of sections of the screen calculated in step S120. That is, it is determined whether the current granularity n enables the nodes to be displayed in the displayed area or not. If this condition is met, the process proceeds to step S127. Otherwise, the process proceeds to step S125.

(S125) The graph generation unit 123 determines whether all of the remaining jobs are the monitoring points set at above-described step S11 or not. If all of the remaining jobs are the initially set jobs, the process proceeds to step S127. Otherwise, the process proceeds to step S126.

(S126) The graph generation unit 123 increases (increments) the granularity n by one, and then the process proceeds to step S122.

(S127) The graph generation unit 123 fixes the current granularity n. Then, the graph generation unit 123 sets jobs in which at least one of the number of preceding jobs and the number of succeeding jobs is greater than or equal to the granularity n, as monitoring jobs, in addition to the initially set monitoring points. The monitoring points to be set here are branching points and meeting points, excluding the case where the granularity n is one.

Figure 12:
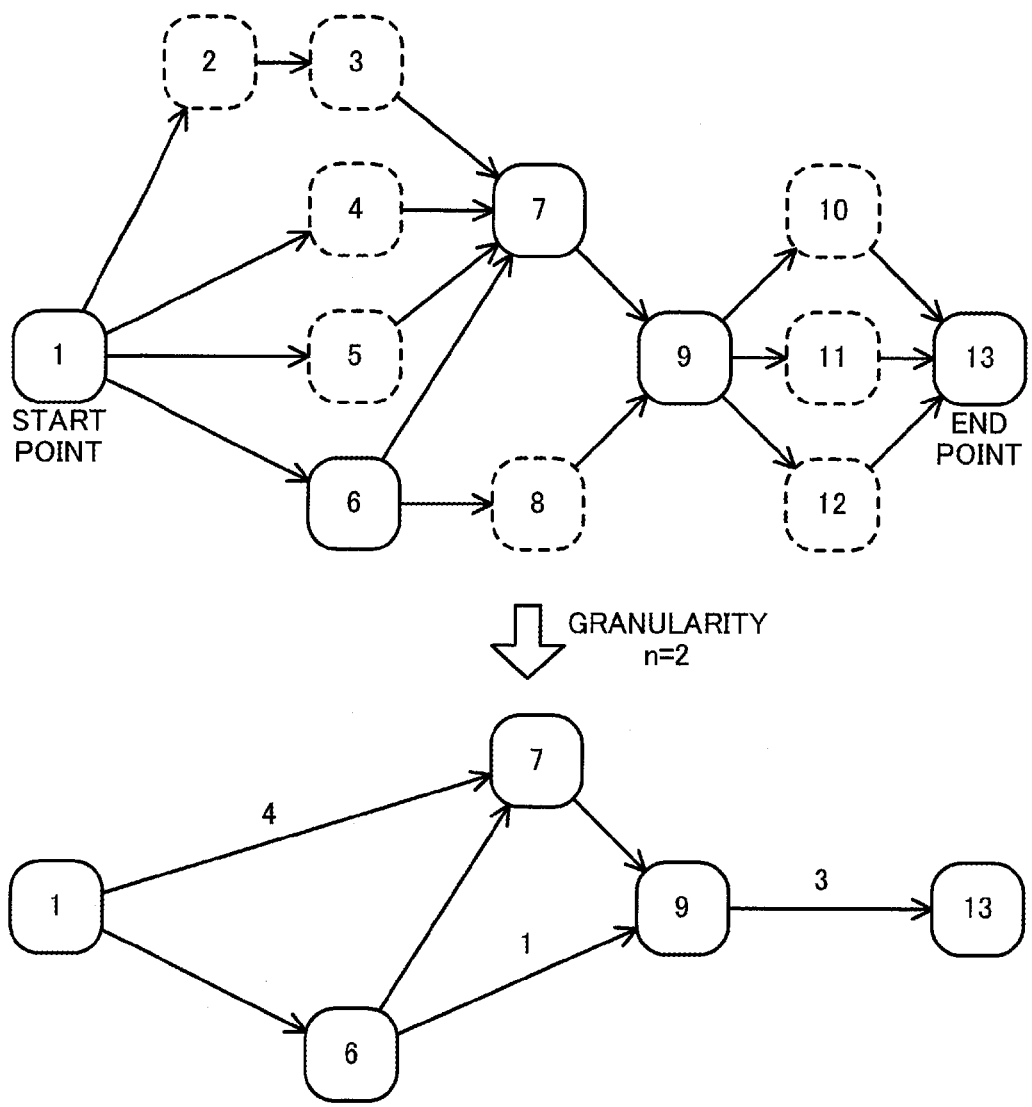
FIG. 12 is a first view illustrating an example of a change of monitoring points according to granularity.

FIG. 12 is a first view illustrating an example of a change of monitoring points according to granularity.

The following describes the case of selecting monitoring points in accordance with the flowcharts of FIGS. 10 and 11 from the jobs 1 to 13 explained with reference to FIG. 4. In this connection, it is assumed that there are no user-specified jobs. In addition, the jobs 1 and 13 are fixedly set as monitoring points since they are a start point and an end point, respectively.

In the case of the granularity n of one, all of the jobs 1 to 13 are set as monitoring points. In the case where it is possible to display all of the thirteen nodes in the display area of the graph, the granularity n is fixed to one. In the case of the granularity n of two, the jobs 1, 6, 7, 9, and 13 out of the jobs 1 to 13 are set as monitoring points. The jobs 2 to 5, 8, and 10 to 12 each have one preceding job and one succeeding job, and therefore are excluded from monitoring points. In the case where it is possible to display five nodes in the display area of the graph, the granularity n is fixed to two.

In this connection, as will be described later, the number of jobs that exist but are hidden between monitoring points corresponding to two nodes is indicated with a link connecting the two nodes in the graph. Hidden jobs are all jobs existing in paths from one node to another. If there are no such hidden jobs, no numerical value is indicated. There are four jobs (jobs 2 to 5) hidden between the jobs 1 and 7. There is one job (job 8) hidden between the jobs 6 and 9. There are three jobs (jobs 10 to 12) hidden between the jobs 9 and 13.

Figure 13A:
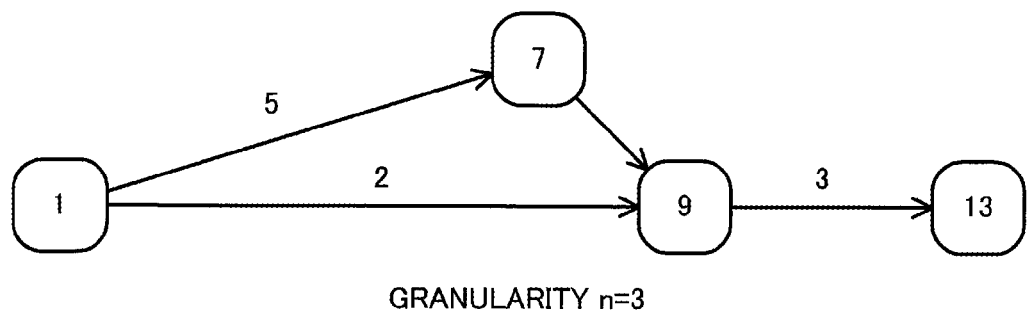
FIGS. 13A to 13C are second views illustrating examples of a change of monitoring points according to granularity.
Figure 13B:
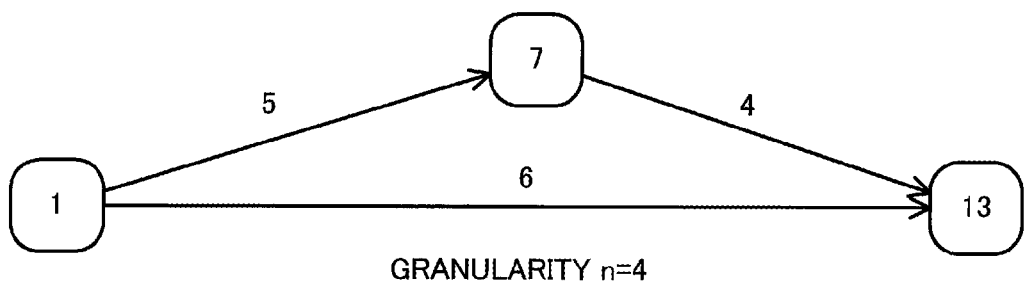
Figure 13C:
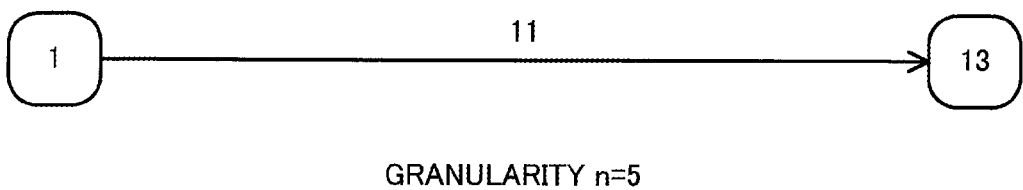

FIGS. 13A to 13C are second views illustrating examples of a change of monitoring points according to granularity.

In the case of the granularity n of three, the jobs 1, 7, 9, and 13 are set as monitoring points. The job 6 has one preceding job and two succeeding jobs, and therefore is excluded from monitoring points when the granularity n becomes three. In the case where it is possible to display four nodes in the display area of the graph, the granularity n is fixed to three. In this case, five jobs (jobs 2 to 6) are hidden between the jobs 1 and 7, and two jobs (jobs 6 and 8) are hidden between the jobs 1 and 9.

In the case of the granularity n of four, the jobs 1, 7, and 13 are set as monitoring points. The job 9 has two preceding jobs and three succeeding jobs, and therefore is excluded from monitoring points when the granularity n becomes four. In the case where it is possible to display three nodes in the display area of the graph, the granularity n is fixed to four. In this case, six jobs (jobs 6 and 8 to 12) are hidden between the jobs 1 and 13, and four jobs (jobs 9 to 12) are hidden between the jobs 7 and 13.

In the case of the granularity n of five, the jobs 1 and 13 are set as monitoring points. The job 7 has four preceding jobs and one succeeding job, and therefore is excluded from monitoring points when the granularity n becomes five. In this case, eleven jobs (jobs 2 to 12) are hidden between the jobs 1 and 13. Only the initiating set jobs are remaining. In this way, when the granularity is gradually increased, only the initially set jobs finally remain in the graph.

Figure 14:
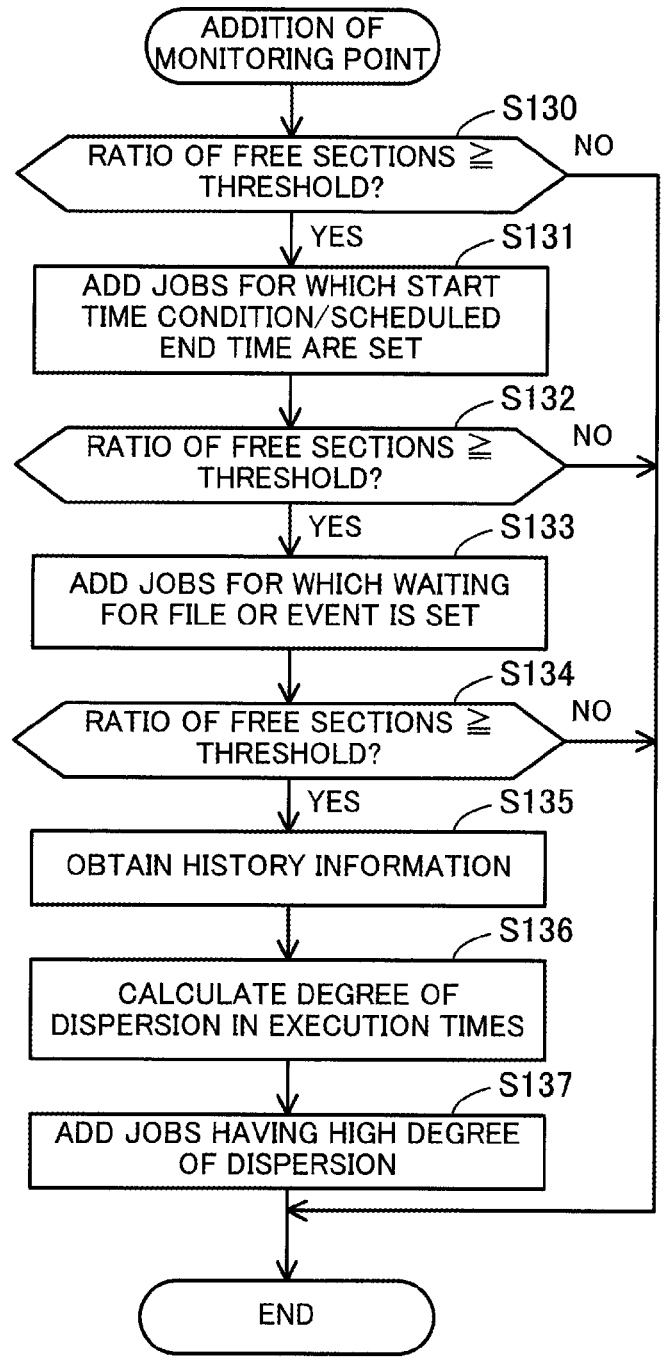
FIG. 14 is a flowchart illustrating an exemplary procedure for an addition of monitoring points.

FIG. 14 is a flowchart illustrating an exemplary procedure for an addition of monitoring points. The process described in the flowchart of FIG. 14 is performed at above-described step S13.

(S130) The graph generation unit 123 calculates a ratio of free sections at the time of completion of above-described step S12. For example, the graph generation unit 123 calculates the number of free sections by subtracting the number of monitoring points set at and prior to step S12 from the number of sections of the screen, and divides the number of free sections by the number of sections of the screen. Then, the graph generation unit 123 determines whether the ratio of free sections is greater than or equal to a threshold for free sections indicated in the control information table 112. If this condition is met, the process proceeds to step S131. Otherwise, the process is completed. In this connection, a negative value may be set as the threshold for free sections. In this case, a few nodes are allowed to be displayed outside the display area.

(S131) The graph generation unit 123 searches the job information table 213 to find jobs for which at least one of a start time condition and a scheduled end time is set. Then, if the found jobs are not set as monitoring points, the graph generation unit 123 additionally sets the jobs as monitoring points. The reason why such a job is set as a monitoring point is because the user takes notice of its execution timing and therefore it is preferable to monitor a delay in the timing.

(S132) The graph generation unit 123 calculates a ratio of free sections at the time of completion of step S131, and determines whether the ratio of free sections is greater than or equal to the threshold. If this condition is met, the process proceeds to step S133. Otherwise, the process is completed.

(S133) The graph generation unit 123 searches the job information table 213 to find jobs whose starting conditions include waiting for a file or an event. Then, if the found jobs are not set as monitoring points, the job generation unit 123 additionally sets the jobs as monitoring points. In this connection, the reason why such a job is set as a monitoring point is because there is a case where the job may not be able to be started even after its preceding jobs are completed, and it is preferable to monitor whether the job is delayed or not, in order to identify the cause of a delay.

(S134) The graph generation unit 123 calculates a ratio of free sections at the time of completion of step S133, and determines whether the ratio of free sections is greater than or equal to the threshold or not. If this condition is met, the process proceeds to step S135. Otherwise, the process is completed.

(S135) The data acquisition unit 121 accesses the job management server 200 and obtains the history information (history information table 214) from the job management server 200.

(S136) The graph generation unit 123 calculates a degree of dispersion in the execution times for a predetermined number of past executions of each job, with reference to the history information table 214. As an index indicating the degree of dispersion, for example, a statistical dispersion or a standard deviation may be used. For example, the graph generation unit 123 calculates each execution time from a difference between an end time and a start time indicated in the history information table 214, and obtains a distribution of execution times. In this connection, the graph generation unit 123 may calculate a degree of dispersion only for jobs that are yet to be set as monitoring points.

(S137) The graph generation unit 123 sorts the jobs that are yet to be set as monitoring points, in decreasing order of the degree of dispersion calculated at step S136. Then, the graph generation unit 123 selects as many jobs as the number of free sections obtained at the time of the completion of step S133, in decreasing order of the degree of dispersion, and additionally sets the selected jobs as monitoring points. The reason why such a job is added as a monitoring point is because this job has a higher risk in delay than the other jobs.

Figure 15:
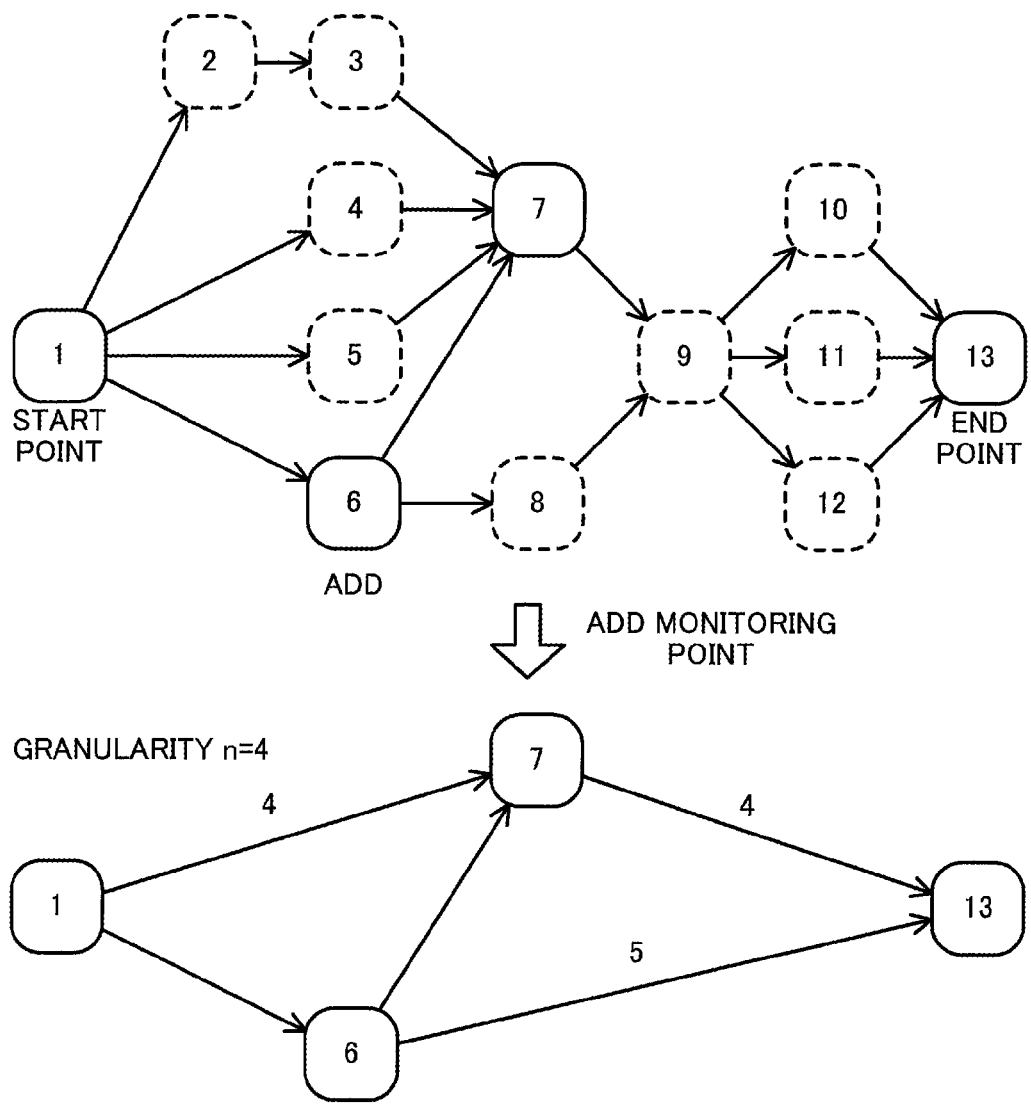
FIG. 15 illustrates an example of an addition of monitoring points.

FIG. 15 illustrates an example of an addition of monitoring points.

The following describes the case where the granularity n is fixed to four at above-described step S12. As described earlier, in the case where the granularity n is four, the job 7 having four preceding jobs is set as a monitoring point, in addition to the start point job 1 and the end point job 13. It is assumed that, after that, the job 6 is set as a monitoring point at any of above-described steps S131, S133, and S137.

Then, the jobs 1, 6, 7, and 13 are displayed in the graph. Four jobs (jobs 2 to 5) are hidden between the jobs 1 and 7. Five jobs (jobs 8 to 12) are hidden between the jobs 6 and 13. Four jobs (jobs 9 to 12) are hidden between the jobs 7 and 13. If the granularity n is increased one by one, there is a fear that the number of candidates for monitoring points may greatly be decreased at a certain time point, which results in too few monitoring points. Adding monitoring points as described above makes it possible to adjust the number of nodes in the graph to an appropriate level.

Figure 16:
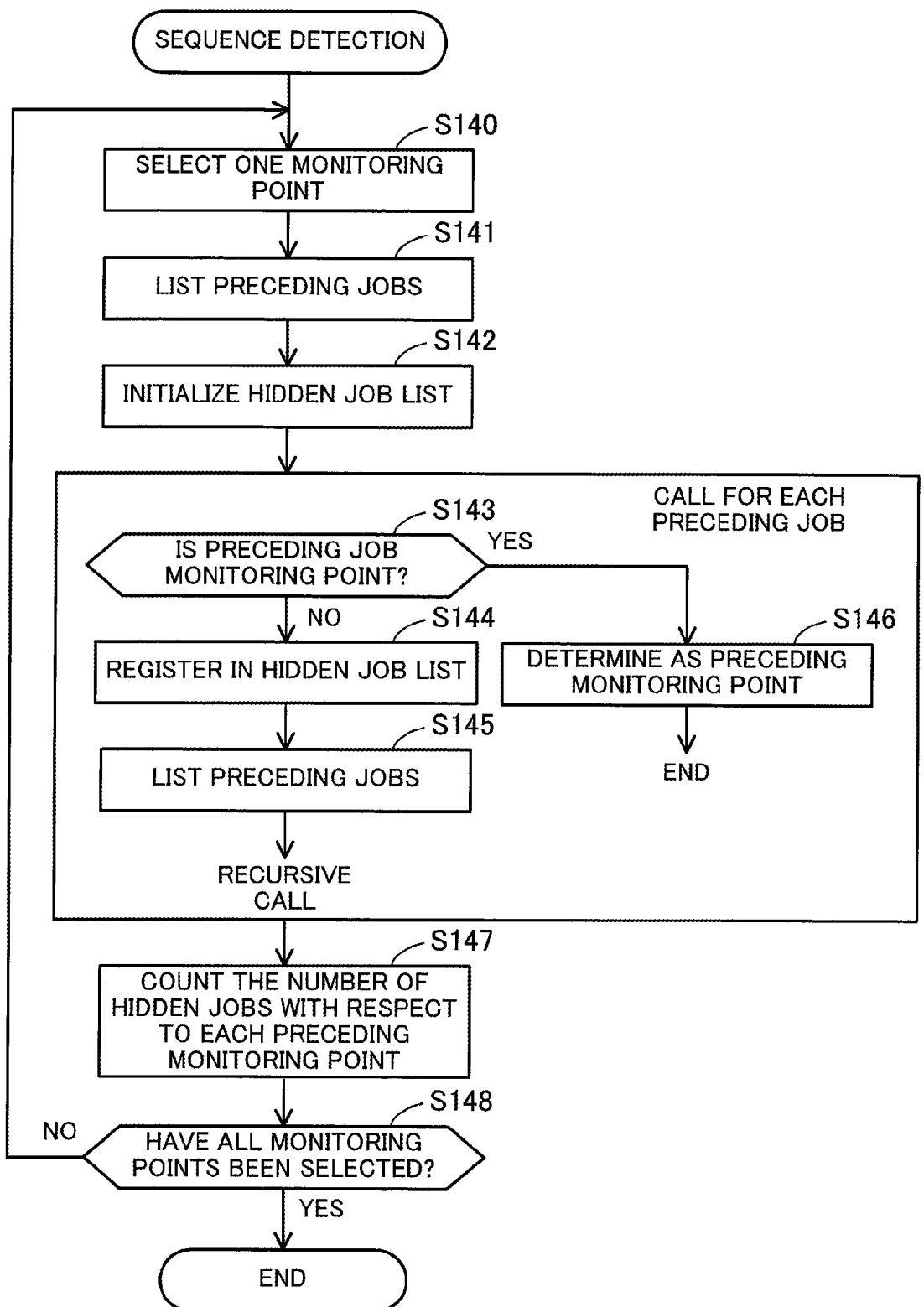
FIG. 16 is a flowchart illustrating a procedure for sequence detection.

FIG. 16 is a flowchart illustrating an exemplary procedure for sequence detection. The process described in the flowchart of FIG. 16 is performed at above-described step S14.

(S140) The graph generation unit 123 selects one monitoring point.

(S141) The graph generation unit 123 lists the preceding jobs of the monitoring point selected at step S140, with reference to the job information table 213.

(S142) The graph generation unit 123 initializes a hidden job list. That is, the graph generation unit 123 prepares an empty hidden job list for the selected monitoring point. Following steps S143 to S146 are recursively executed for each preceding job.

(S143) The graph generation unit 123 determines whether a preceding job in question is set as a monitoring point or not. If the preceding job in question is set as a monitoring point, the process proceeds to step S146. If the preceding job in question is not set as a monitoring point (i.e., the job is a hidden job), the process proceeds to step S144.

(S144) The graph generation unit 123 registers the preceding job in question in the hidden job list.

(S145) The graph generation unit 123 lists the preceding jobs of the preceding job in question, with reference to the job information table 213. Then, the graph generation unit 123 recursively calls steps S143 to S146 for each of the now listed preceding jobs. At this time, the graph generation unit 123 makes a copy of the current hidden job list for each of the preceding jobs.

(S146) The graph generation unit 123 determines the preceding job in question as a preceding monitoring point of the monitoring point selected at step S140. Then, the graph generation unit 123 completes the recursive processing of steps S143 to S146 regarding a path from the monitoring point selected at step S140 to the preceding monitoring point.

The above recursive execution of steps S143 to S146 results in determining one or more preceding monitoring points with respect to the monitoring point selected at step S140. Hidden job lists corresponding to the respective paths leading to the preceding monitoring points are created.

(S147) The graph generation unit 123 counts the number of hidden jobs on the basis of the jobs registered in the one or more hidden job lists with respect to each preceding monitoring point.

(S148) The graph generation unit 123 determines whether all of the monitoring points have been selected at step S140 or not. If there is any unselected monitoring point, the process proceeds back to step S140. If all of the monitoring points have been selected, the process is completed. In the manner described above, the graph generation unit 123 is able to detect the sequence relationship among the monitoring points and the number of hidden jobs between two monitoring points. The graph generation unit 123 is then able to generate a graph including nodes corresponding to the monitoring points and indicating the number of hidden jobs with each link, on the basis of the detected sequence relationship and the detected number of hidden jobs.

Figure 17:
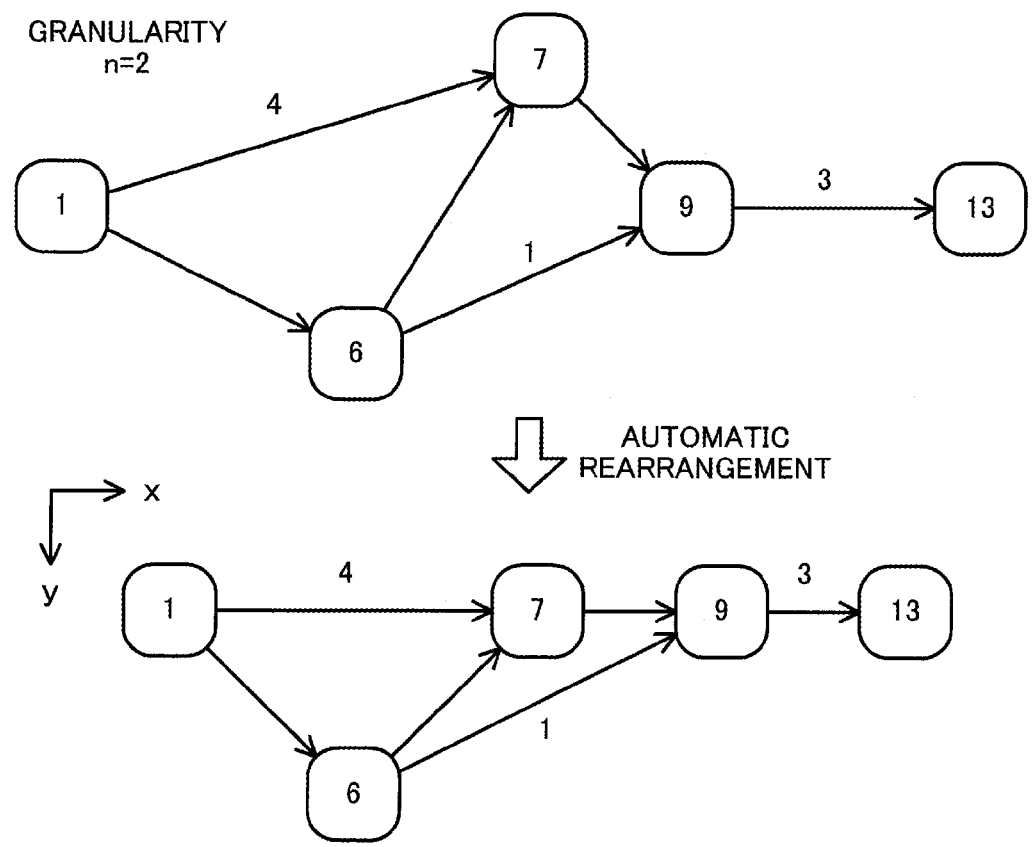
FIG. 17 illustrates an example of automatic rearrangement of nodes.

FIG. 17 illustrates an example of automatic rearrangement of nodes.

In the case where the automatic rearrangement of ON is set in the control information table 112, the nodes corresponding to monitoring points are arranged closer to each other at above step S16. For example, the graph generation unit 123 arranges a node corresponding to a start point at coordinates (1, 1), which are the upper left section of the display area. In addition, the graph generation unit 123 arranges a node corresponding to a succeeding monitoring point on the right side (in the positive direction of the x axis) of the section where the node has been arranged. If there is a plurality of succeeding monitoring points, the graph generation unit 123 arranges the second and subsequent succeeding monitoring points on the lower side (in the positive direction of the y axis) of the first succeeding monitoring point. In this connection, the above arrangement is one example, and the graph generation unit 123 is able to employ another arrangement method so as to improve visualization of the graph.

The following describes an example of changing a display form according to a user operation after a graph is displayed on the monitoring flow screen 44 in accordance with the procedure of FIG. 9.

Figure 18:
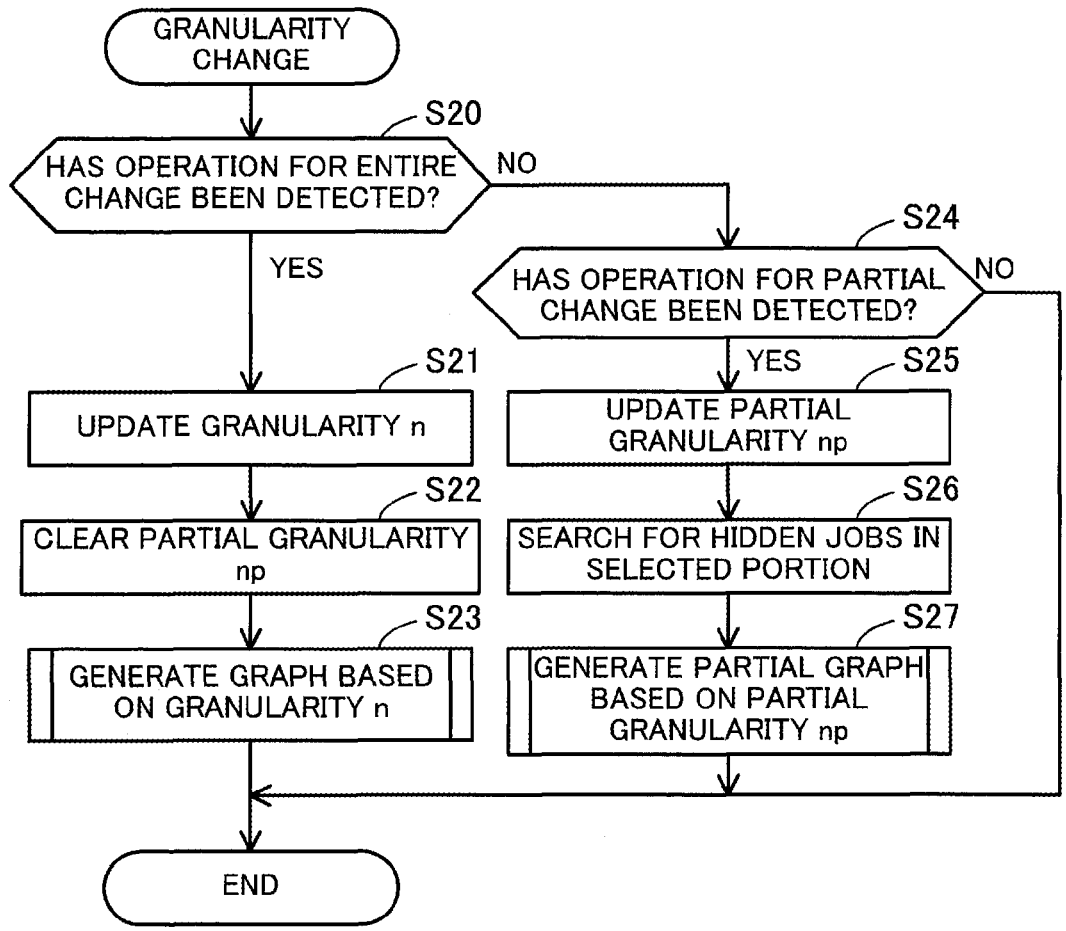
FIG. 18 is a flowchart illustrating an exemplary procedure for a change of granularity.

FIG. 18 is a flowchart illustrating an exemplary procedure for a change of granularity.

(S20) When detecting a user operation made on the monitoring flow screen 44, the operation detection unit 122 determines whether the user operation is to change the granularity for the entire graph or not. The user operation for changing the granularity for the entire graph may be, for example, an operation of rotating the scroll wheel of a mouse without selecting any link, or the like. If the user operation is to change the granularity for the entire graph, the process proceeds to step S21. Otherwise, the process proceeds to step S24.

(S21) The graph generation unit 123 updates the granularity n in the control information table 112 in accordance with the user operation. For example, when detecting a user operation of rotating the scroll wheel in a specified direction, the graph generation unit 123 decreases (decrements) the granularity n by one. Decreasing the granularity n results in an increase in the number of nodes to be displayed in the graph. In addition, for example, when detecting a user operation of rotating the scroll wheel in the direction opposite to the above direction, the graph generation unit 123 increases (increments) the granularity n by one.

(S22) The graph generation unit 123 clears the partial granularity np in the control information table 112. For example, the graph generation unit 123 sets the partial granularity np to the same value as the granularity n.

(S23) The graph generation unit 123 generates a graph based on the new granularity n. The graph may be generated in accordance with the same procedure as described with reference to FIG. 9. However, in step S12, the granularity n is not determined in accordance with the procedure of FIG. 11, but monitoring points are selected by comparing the granularity n determined at step S21 with the number of preceding jobs and the number of succeeding jobs of each job. In generating the graph at the time of changing the granularity, step S13 (addition of monitoring points) may be skipped. The display control unit 124 re-draws the display area of the monitoring flow screen 44 so as to display the generated graph. At this time, the graph generated after the granularity is changed may not entirely be displayed in the display area. Then, the process of changing the granularity is completed.

(S24) The operation detection unit 122 determines whether the detected user operation made on the monitoring flow screen 44 is to change the granularity for a part of the graph or not. The user operation for changing the granularity for a part of the graph may be, for example, an operation of selecting one link and rotating the scroll wheel of the mouse. In the case where the user operation is to change the granularity for a part of the graph, the process proceeds to step S25. Otherwise, the process of changing the granularity is completed.

(S25) The graph generation unit 123 updates the partial granularity np in the control information table 112 in accordance with the user operation. For example, when a user operation of rotating the scroll wheel in a specified direction is detected, the graph generation unit 123 decreases (decrements) the partial granularity np by one. Decreasing the partial granularity np results in an increase in the number of nodes to be displayed in the graph. In addition, for example, when a user operation of rotating the scroll wheel in the direction opposite to the above direction is detected, the graph generation unit 123 increases (increments) the partial granularity np by one. In this connection, the initial value of the partial granularity np is the same as the granularity n.

(S26) The graph generation unit 123 searches the job information table 213 to find jobs hidden in the portion selected by the user. For example, the graph generation unit 123 searches for the jobs that are executed between the monitoring points corresponding to the both ends of the selected link.

(S27) The graph generation unit 123 generates a partial graph corresponding to the selected portion, based on the new partial granularity np. The partial graph is generated in the same manner as step S23. However, target jobs here are only ones that belong to the portion selected by the user (including jobs originally hidden in accordance with the procedure of FIG. 9). The display control unit 124 re-draws the display area of the monitoring flow screen 44 so as to display a graph including the generated partial graph. At this time, the graph generated after the partial granularity is changed may not entirely be displayed in the display area. Then, the process of changing the granularity is completed.

Figure 19:
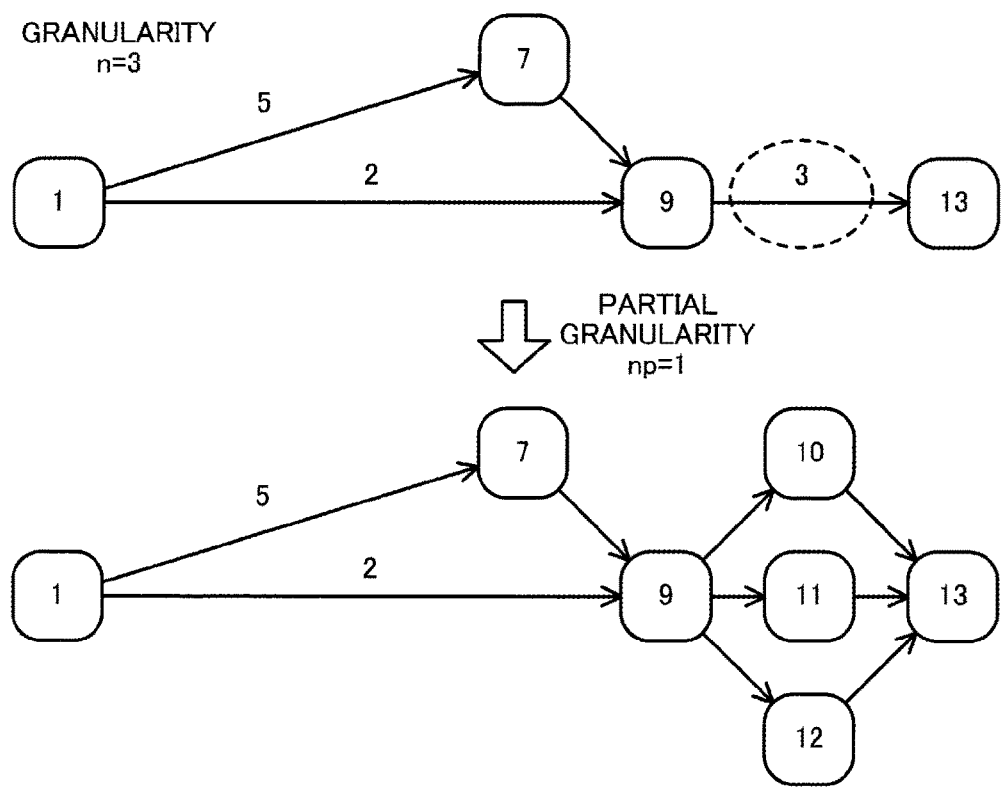
FIG. 19 illustrates an example of a change of partial granularity.

FIG. 19 illustrates an example of a change of partial granularity.

Now it is assumed that the granularity n at the time of first generating a graph is three. As described earlier, in the case where the granularity n is three, three jobs are hidden between the jobs 9 and 13. When the user wants to confirm the execution states of the jobs existing between the jobs 9 and 13, the user selects a link between the jobs 9 and 13 and makes an operation for decreasing the partial granularity np (for example, rotates the scroll wheel of the mouse). When the partial granularity np for the selected portion is changed to one, the jobs 10 to 12, which have been hidden between the jobs 9 and 13, appear in the graph.

The following describes generation of a graph in an active monitoring mode.

Figure 20:
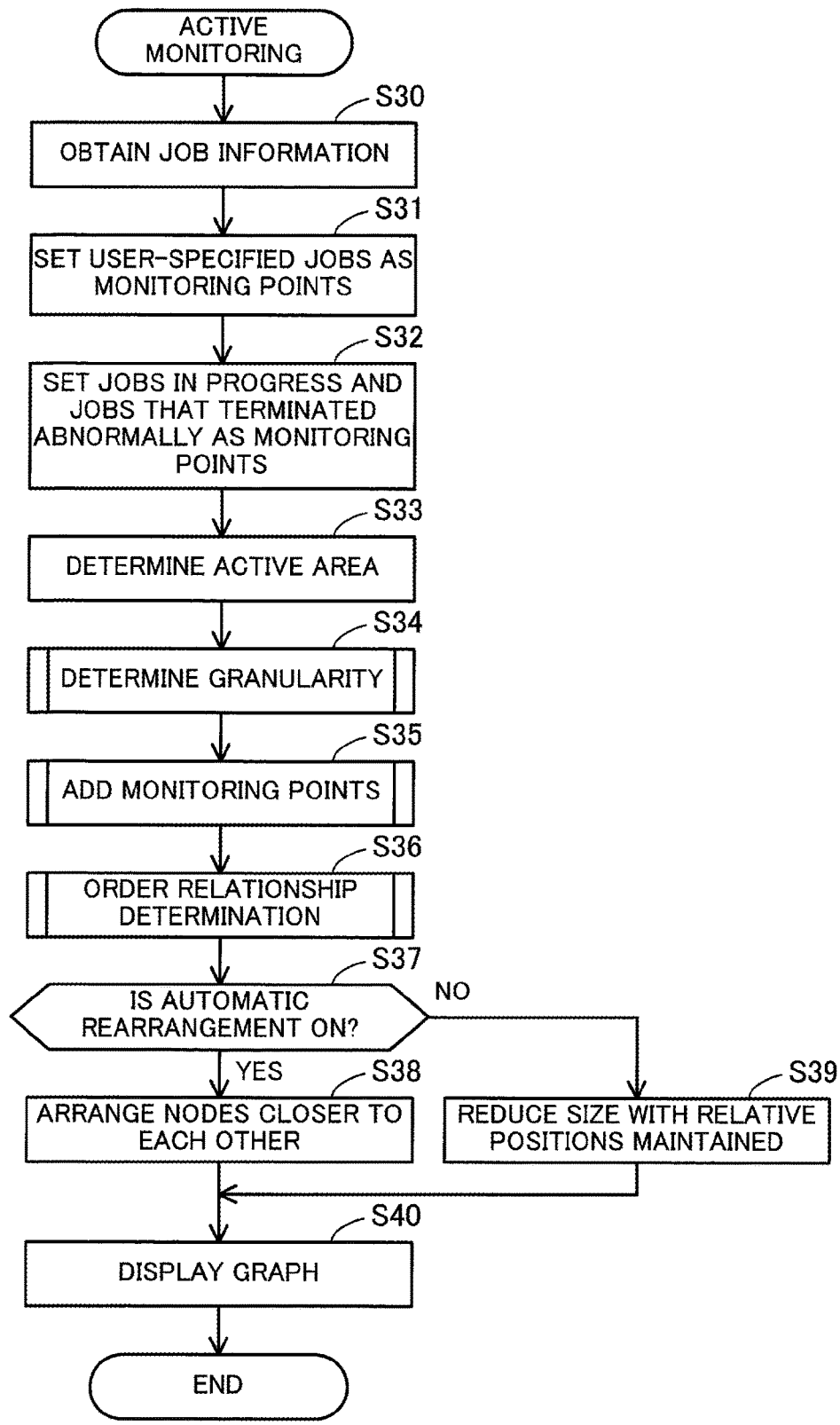
FIG. 20 is a flowchart illustrating an exemplary procedure for active monitoring.

FIG. 20 is a flowchart illustrating an exemplary procedure for active monitoring.

Of steps S30 to S40, steps S30 and S34 to S40 are the same as steps S10 and S12 to S18 executed in the graph generation of FIG. 9, and therefore will not be explained again.

(S31) The graph generation unit 123 confirms that the active monitoring mode of ON is set in the control information table 112. Then, the graph generation unit 123 searches the job information table 213 to find user-specified jobs registered in the control information table 112, and sets the found user-specified jobs as monitoring points. In the active monitoring mode, the start point job and the end point job may not be set as monitoring points.

(S32) The graph generation unit 123 searches the job information table 213 to find jobs in progress and jobs that terminated abnormally, and sets the found jobs as monitoring points.

(S33) The graph generation unit 123 determines a minimum area (active area) including the user-specified jobs, jobs in progress, and jobs that terminated abnormally, on the basis of the monitoring points set at steps S31 and S32. For example, the graph generation unit 123 sets a monitoring point that is executed earliest among a set of the monitoring points set at steps S31 and S32, as a first point in the active area, and sets a monitoring point that is executed last as a last point in the active area. Then, the graph generation unit 123 sets jobs to be displayed between the first point and the last point in the graph (in an area between the line indicating the first point and the line indicating the last point), as jobs belonging to the active area. The active area may not include the start point job and the end point job. After that, steps S34 to S40 are executed only on the jobs belonging to the active area.

Figure 21:
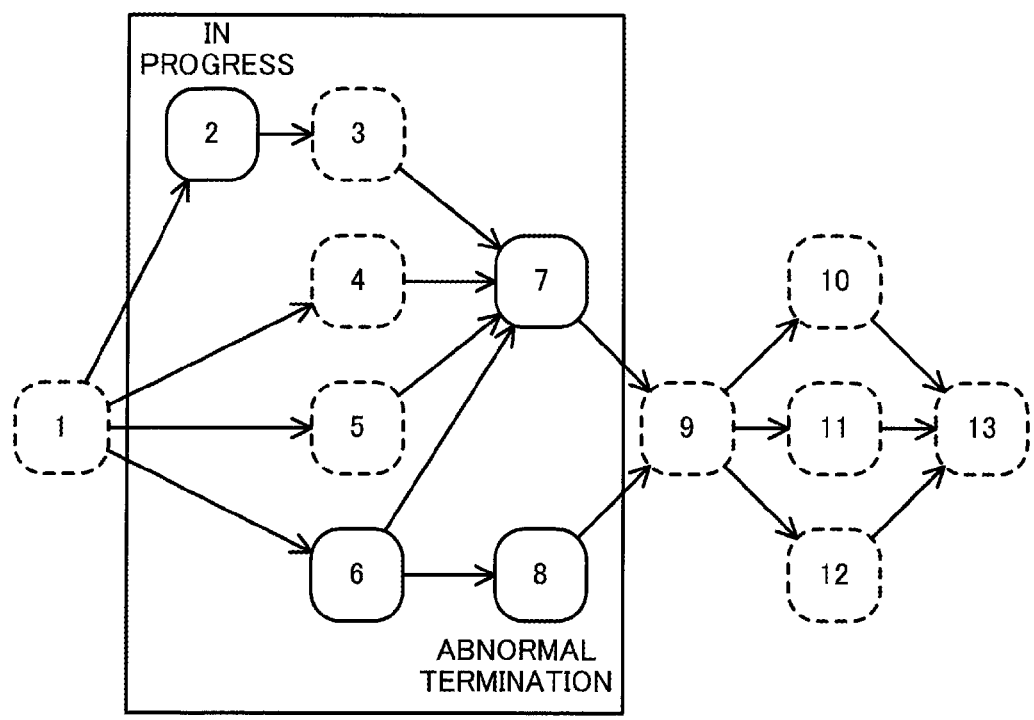
FIG. 21 illustrates an example of an active monitoring mode.

FIG. 21 illustrates an example of an active monitoring mode.

Now it is assumed that the job 2 is in progress and the job 8 terminated abnormally. It is also assumed that there are no user-specified jobs. Then, an active area including the job 2 as the first point and the job 8 as the last point is set. This active area includes the jobs 2 to 8.

In the active monitoring mode, monitoring points are selected from the jobs belonging to the active area, and no monitoring points are selected from the jobs outside the active area. Therefore, the active area is enlarged and is displayed on the monitoring flow screen 44. Referring to the example of FIG. 21, the start point job 1 and the end point job 13 are not displayed in the graph. In the case where the granularity n is fixed to two, the jobs 3 to 5 are hidden and the jobs 2 and 6 to 8 are set as monitoring points, out of the jobs 2 to 8. In this case, on the monitoring flow screen 44, a graph including nodes corresponding to the jobs 2 and 6 to 8 is displayed.

According to the system of the second embodiment, some of the jobs registered in the system are automatically selected, thereby limiting the jobs to be displayed in the graph on the monitoring flow screen 44. Therefore, even if a great number of jobs are registered in the system, it is possible to decrease the number of nodes to be included in the graph and to overlook an entire business flow including these jobs on one screen. In addition, even in the case where jobs are not in a hierarchical form that is suitable for monitoring, monitoring points are automatically limited, and therefore an easy-to-understand graph is generated.

In addition, jobs that are probably important in monitoring the execution states of jobs are automatically extracted as monitoring points, and thereby a graph with high usability is generated. For example, jobs that serve as milestones, such as meeting points having many preceding jobs and branching points having many succeeding jobs, are extracted. Further, jobs that may cause a delay in a business flow, such as jobs having various kinds of starting conditions and jobs having variation in execution times, are extracted. Still further, using the active monitoring mode makes it possible to display a graph that displays only an active area including jobs in progress and jobs that terminated abnormally. Using a graph in the normal mode and a graph in the active monitoring mode together makes it much easier for users to perform job monitoring.

Third Embodiment

The following describes a third embodiment. Differential features from the second embodiment will mainly be described, and explanation on the same features as the second embodiment will be omitted. In the system of the above-described second embodiment, the client 100 obtains the job information and the history information from the job management server 200, and generates a graph for job monitoring. On the other hand, in the third embodiment, a job management server is designed to generate a graph for job monitoring in response to a request from a client.

Figure 22:
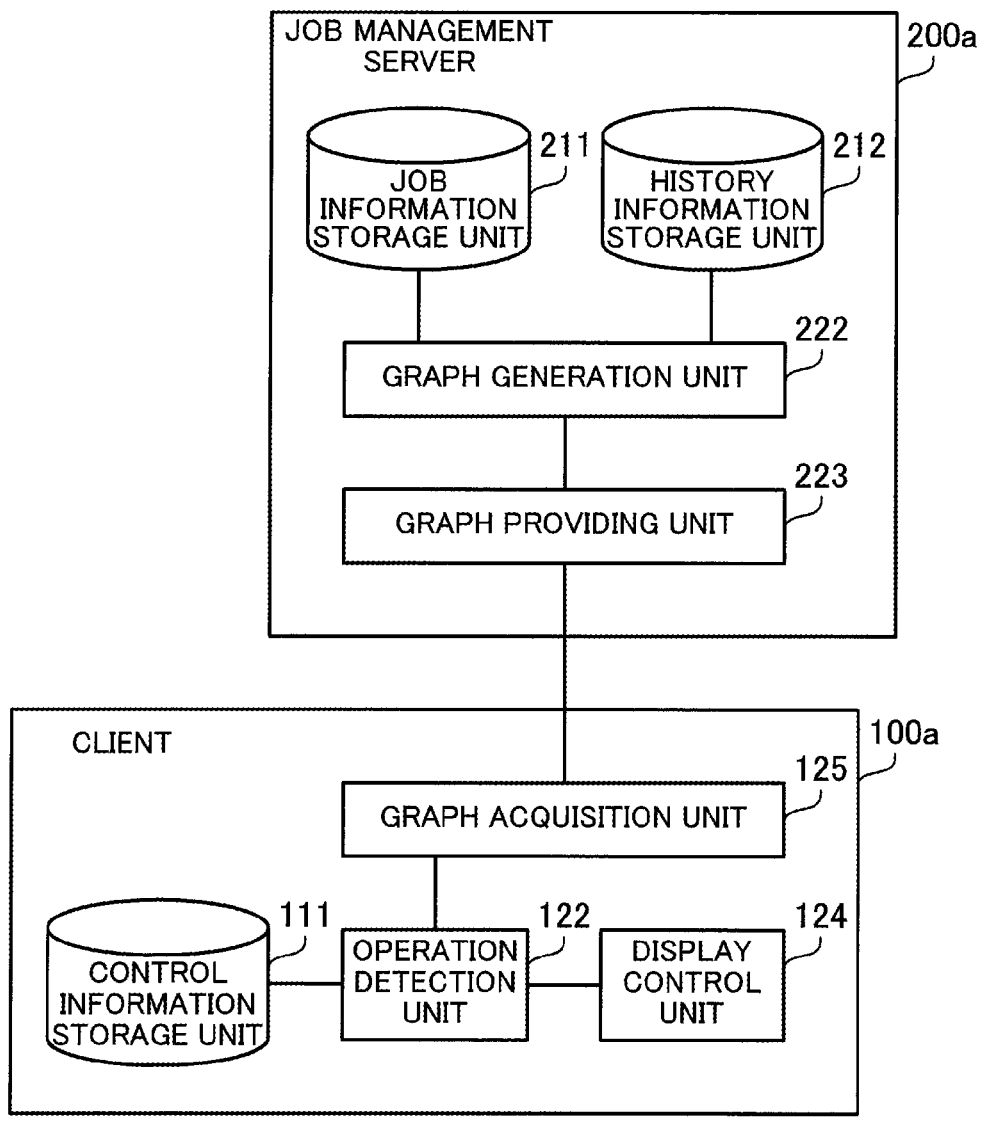
FIG. 22 is a block diagram illustrating an example of other functions of a client and a job management server.

FIG. 22 is a block diagram illustrating an example of other functions of a client and a job management server.

A system of the third embodiment includes a client 100a and a job management server 200a. The client 100a and job management server 200a correspond to the client 100 and the job management server 200 of the second embodiment, respectively.

The client 100a includes a control information storage unit 111, an operation detection unit 122, a display control unit 124, and a graph acquisition unit 125. Unlike the client 100 of the second embodiment, the client 100a does not include the graph generation unit 123.

When receiving a request for generating a graph from the operation detection unit 122, the graph acquisition unit 125 transfers the request to the job management server 200a. At this time, the graph acquisition unit 125 transmits control information (control information table 112) stored in the control information storage unit 111 to the job management server 200a. In addition, when obtaining information on the graph from the job management server 200a, the graph acquisition unit 125 supplies the graph to the operation detection unit 122. Thereby, the graph generated by the graph management server 200a is displayed on a display 41.

The job management server 200a includes a job information storage unit 211, a history information storage unit 212, a graph generation unit 222, and a graph providing unit 223.

When receiving a request for generating a graph from the graph providing unit 223, the graph generation unit 222 generates a graph based on job information table 213 stored in the job information storage unit 211 and the control information received from the client 100a. The graph generation unit 222 may refer to history information table 214 stored in the history information storage unit 212. The graph generation unit 222 generates a graph in the same way as the graph generation unit 123 of the second embodiment. The graph generation unit 222 provides the generated graph to the graph providing unit 223.

When receiving a request for generating a graph from the client 100a, the graph providing unit 223 notifies the graph generation unit 222 of the request. The request for generating the graph additionally includes the control information stored in the control information storage unit 111. In addition, the graph providing unit 223 transmits information on the graph generated by the graph generation unit 222 to the client 100a.

The system of the third embodiment is able to provide the same effects as that of the second embodiment. In addition, in the system of the third embodiment, the job management server 200a visualizes the execution states of jobs, which reduces the workload of the client 100a. Further, it is not needed to incorporate a software module for generating a graph in the client 100a, which simplifies the configuration of the client 100a and makes it easy to perform maintenance management.

In this connection, as described earlier, the information processing of the first embodiment may be implemented by causing the information processing apparatus 10 to execute a program. Further, the information processing of the second embodiment may be implemented by causing the client 100 and the information processing apparatus 200 to execute programs. Still further, the information processing of the third embodiment may be implemented by causing the client 100a and the job management server 200a to execute programs.

A program may be recorded on a computer-readable recording medium (for example, recording medium 43). Recording media include magnetic disks, optical discs, magneto-optical disks, semiconductor memories, etc., for example. The magnetic disks include FDs and HDDs. The optical discs include CD, CD-R (Recordable), CD-RW (Rewritable), DVD, DVD-R, and DVD-RW. The program may be recorded on portable recording media, which are then distributed. In this case, the program may be copied (installed) from a portable recording medium to another recording medium such as an HDD (for example, HDD 103), and then be executed.

According to one aspect, it becomes easy to monitor the execution states of jobs.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that various changes, substitutions, and alterations could be made hereto without departing from the spirit and scope of the invention.

What is claimed is:

1. A non-transitory computer-readable storage medium storing a computer program that causes a computer to perform a procedure including:
    obtaining a job database including information that indicates presence or absence of processed data handed over between computer jobs;
    calculating a number of screen sections by dividing a display area size by a node size;
    calculating, with respect to each of the computer jobs, a number of preceding computer jobs that hand over processed data to the each of the computer jobs and a number of succeeding computer jobs that take over processed data from the each of the computer jobs, based on the job database;
    classifying the computer jobs into a first subset and a second subset, the first subset being a collection of computer jobs in which at least one of the number of preceding computer jobs and the number of succeeding computer jobs is greater than or equal to a first threshold greater than one, the second subset being a collection of computer jobs in which both the number of preceding computer jobs and the number of succeeding jobs are smaller than the first threshold;
    increasing the first threshold and repeating the classifying, until the screen sections outnumber the computer jobs belonging to the first subset;
    calculating a ratio of free sections to the screen sections;
    moving computer jobs from the second subset to the first subset as long as the ratio of free sections is greater than or equal to a second threshold; and
    generating a graph dataset including nodes representing the first subset of the computer jobs, the graph dataset also including edges each connecting two nodes to represent presence of processed data ultimately handed over between computer jobs corresponding to the two nodes, each of the edges having a numeric value representing a number of hidden nodes that are hidden behind said each of the edges, the hidden nodes corresponding to the second subset of the computer jobs.

2. The non-transitory computer-readable storage medium according to claim 1, wherein the procedure further includes determining the first threshold according to the display area size.

3. The non-transitory computer-readable storage medium according to claim 1, wherein:
    the job database includes information indicating execution states of the computer jobs; and
    the classifying includes classifying computer jobs that belong to an active area, the active area including one or both of a computer job in progress and a computer job with which an error occurred.

4. The non-transitory computer-readable storage medium according to claim 1, wherein:
    the job database includes information indicating starting conditions for starting the computer jobs; and
    the moving includes moving computer jobs for which prescribed types of starting conditions other than completion of preceding computer jobs are set.

5. The non-transitory computer-readable storage medium according to claim 1, wherein:
    the procedure further includes obtaining history information indicating past execution times of the computer jobs, and
    the moving includes moving computer jobs whose index is greater than or equal to a third threshold, based on the history information, the index indicating a degree of dispersion in the execution times.

6. A job monitoring support method comprising:
    obtaining, by a processor, a job database including information that indicates presence or absence of processed data handed over between computer jobs;
    calculating, by the processor, a number of screen sections by dividing a display area size by a node size;
    calculating, by the processor, with respect to each of the computer jobs, a number of preceding computer jobs that hand over processed data to the each of the computer jobs and a number of succeeding computer jobs that take over processed data from the each of the computer jobs, based on the job database;
    classifying, by the processor, the computer jobs into a first subset and a second subset, the first subset being a collection of computer jobs in which at least one of the number of preceding computer jobs and the number of succeeding computer jobs is greater than or equal to a first threshold greater than one, the second subset being a collection of computer jobs in which both the number of preceding computer jobs and the number of succeeding jobs are smaller than the first threshold;

increasing, by the processor, the first threshold and repeating the classifying, until the screen sections outnumber the computer jobs belonging to the first subset;

calculating, by the processor, a ratio of free sections to the screen sections;

moving, by the processor, computer jobs from the second subset to the first subset as long as the ratio of free sections is greater than or equal to a second threshold; and generating, by the processor, a graph dataset including nodes representing the first subset of the computer jobs, the graph dataset also including edges each connecting two nodes to represent presence of processed data ultimately handed over between computer jobs corresponding to the two nodes, each of the edges having a numeric value representing a number of hidden nodes that are hidden behind said each of the edges, the hidden nodes corresponding to the second subset of the computer jobs.

7. An information processing apparatus comprising:

a memory configured to store a job database including information that indicates presence or absence of processed data handed over between computer jobs; and a processor configured to perform a procedure including:

calculating a number of screen sections by dividing a display area size by a node size;

calculating, with respect to each of the computer jobs, a number of preceding computer jobs that hand over processed data to the each of the computer jobs and a number of succeeding computer jobs that take over processed data from the each of the computer jobs, based on the job database in the memory;

classifying the computer jobs into a first subset and a second subset, the first subset being a collection of computer jobs in which at least one of the number of preceding computer jobs and the number of succeeding computer jobs is greater than or equal to a first threshold greater than one, the second subset being a collection of computer jobs in which both the number of preceding computer jobs and the number of succeeding jobs are smaller than the first threshold;

increasing the first threshold and repeating the classifying, until the screen sections outnumber the computer jobs belonging to the first subset;

calculating a ratio of free sections to the screen sections;

moving computer jobs from the second subset to the first subset as long as the ratio of free sections is greater than or equal to a second threshold; and generating a graph dataset including nodes representing the first subset of the computer jobs, the graph dataset also including edges each connecting two nodes to represent presence of processed data ultimately handed over between computer jobs corresponding to the two nodes, each of the edges having a numeric value representing a number of hidden nodes that are hidden behind said each of the edges, the hidden nodes corresponding to the second subset of the computer jobs.

\* \* \* \* \*